(12) United States Patent
Gavin et al.

(10) Patent No.: US 7,862,870 B2
(45) Date of Patent: Jan. 4, 2011

(54) FILMS FOR INFLATABLE CUSHIONS

(75) Inventors: James Gavin, Lake Forest, IL (US); Alan Box, Atlanta, GA (US); Tom McNellis, Tinley Park, IL (US); Jennifer Lawrence, Granville, NY (US)

(73) Assignee: Pregis Innovative Packaging, Inc., Deerfield, IL (US)

( * ) Notice: Subject to any disclaimer, the term of this patent is extended or adjusted under 35 U.S.C. 154(b) by 556 days.

(21) Appl. No.: 11/123,090

(22) Filed: May 6, 2005

(65) Prior Publication Data

US 2006/0251833 A1    Nov. 9, 2006

(51) Int. Cl.
*B32B 1/00*    (2006.01)
*B32B 1/02*    (2006.01)
*B32B 1/08*    (2006.01)

(52) U.S. Cl. .......... 428/34.1; 428/34.2; 428/35.7; 428/35.9; 428/36.9

(58) Field of Classification Search .......... 428/34.1, 428/34.2, 35.9, 36.9, 35.7
See application file for complete search history.

(56) References Cited

U.S. PATENT DOCUMENTS

| | | | | |
|---|---|---|---|---|
| 2,987,114 A * | 6/1961 | Klepper | .......... | 5/654 |
| 3,303,628 A | 2/1967 | Lovas et al. | .......... | 53/22 |
| 3,389,534 A | 6/1968 | Pendleton | .......... | 53/180 |
| 3,559,874 A | 2/1971 | Titchenal | .......... | 229/69 |
| 3,568,227 A * | 3/1971 | Dunham | .......... | 5/655.3 |
| 3,660,189 A | 5/1972 | Troy | .......... | 156/145 |
| 3,667,593 A | 6/1972 | Pendleton | .......... | 206/46 |
| 3,813,845 A | 6/1974 | Weikert | .......... | 53/37 |
| 3,817,803 A | 6/1974 | Horsky | .......... | 156/85 |
| 3,868,285 A | 2/1975 | Troy | .......... | 156/147 |
| 3,914,917 A | 10/1975 | Young | .......... | 53/22 |
| 4,017,351 A | 4/1977 | Larson et al. | .......... | 156/494 |
| 4,049,854 A | 9/1977 | Casey et al. | .......... | 428/72 |
| 4,576,669 A | 3/1986 | Caputo | .......... | 156/145 |
| 4,847,126 A | 7/1989 | Yamashiro et al. | .......... | 428/35.2 |
| 5,454,642 A | 10/1995 | De Luca | .......... | 383/3 |
| 5,791,485 A | 8/1998 | Carbonneau | .......... | 206/720 |
| 5,824,392 A | 10/1998 | Gotoh et al. | .......... | 428/178 |
| 5,873,215 A | 2/1999 | Aquarius et al. | .......... | 53/403 |
| 5,937,614 A | 8/1999 | Watkins et al. | .......... | 53/79 |
| 6,015,047 A | 1/2000 | Greenland | .......... | 206/522 |
| 6,375,785 B1 | 4/2002 | Aquarius | .......... | 156/252 |
| 6,410,119 B1 | 6/2002 | De Luca et al. | .......... | 428/166 |
| 6,423,166 B1 | 7/2002 | Simhaee | .......... | 156/156 |
| 6,460,313 B1 | 10/2002 | Cooper | .......... | 53/79 |
| 6,550,229 B2 | 4/2003 | Sperry et al. | .......... | 53/568 |

(Continued)

FOREIGN PATENT DOCUMENTS

EP    1 022 234    7/2000

(Continued)

OTHER PUBLICATIONS

International Search Report PCT?US2006/016971.

*Primary Examiner*—Marc A Patterson
(74) *Attorney, Agent, or Firm*—Dorsey & Whitney, LLP.

(57) ABSTRACT

Films for inflatable cushions are disclosed. Generally, each of the disclosed films includes a pair of web layers that are aligned to be generally coextensive and that are sealed together by longitudinal and/or transverse seals that cooperatively define the boundaries of inflatable chambers.

44 Claims, 15 Drawing Sheets

U.S. PATENT DOCUMENTS

| | | |
|---|---|---|
| 6,582,800 B2 | 6/2003 | Fuss et al. .................... 428/178 |
| 6,659,150 B1 | 12/2003 | Perkins et al. .............. 156/378 |
| 6,761,960 B2 | 7/2004 | De Luca et al. ............. 428/166 |
| 6,800,162 B2 | 10/2004 | Kannankeril et al. ........ 156/145 |
| 6,804,933 B2 | 10/2004 | Sperry et al. .................. 55/403 |
| 7,361,397 B2 | 4/2008 | Perkins et al. .............. 428/166 |
| 2004/0194878 A1* | 10/2004 | Hull et al. ................... 156/252 |

FOREIGN PATENT DOCUMENTS

| WO | WO 01/85434 | 11/2001 |
|---|---|---|
| WO | WO 03/043903 | 5/2003 |

* cited by examiner

FILMS FOR INFLATABLE CUSHIONS

REFERENCE TO RELATED APPLICATIONS

The subject matter of the present application is related to U.S. patent application Ser. No. 10/088,095 (now issued as U.S. Pat. No. 6,789,376) and Ser. No. 10/360,390. Each of the foregoing patent applications is expressly incorporated by reference herein in its entirety.

FIELD

The subject matter of the present application relates to film configurations. More specifically, the subject matter of the present application relates to films for use in the creation of inflated cushions and methods for making and using the same.

BACKGROUND

A variety of inflated cushions are well known and used for sundry packaging applications. For example, inflated cushions are often used as void-fill packaging in a manner similar to or in place of foam peanuts, crumbled paper, and similar products. Also for example, inflated cushions are often used as protective packaging in place of molded or extruded packaging components.

Generally, inflated cushions are formed from films having two layers that are joined together by seals. The seals can be formed simultaneously with inflation, so as to capture air therein, or prior to inflation to define a film configuration having inflatable chambers. The inflatable chambers can be inflated with air or another gas and thereafter sealed to inhibit or prevent release of the air or gas.

Such film configurations can be stored in rolls or fan-folded boxes in which adjacent inflatable cushions are separated from each other by perforations. During use, a film configuration is inflated to form cushions, and adjacent cushions or adjacent strands of cushions are separated from each other along the perforations.

A variety of film configurations are currently available. Many of these film configurations include seal configurations that tend to waste material, inhibit separation of adjacent inflated cushions, and/or form inflated cushions that are susceptible to under-inflation or leakage, thereby inhibiting utility.

SUMMARY

Films for inflatable cushions are disclosed herein.

Generally, each of the disclosed films includes a pair of web layers that are aligned to be generally coextensive and that are sealed together by longitudinal and/or transverse seals that cooperatively define the boundaries of inflatable chambers.

In accordance with an aspect of the invention, the pair of web layers include a first web layer having a first longitudinal edge and a second longitudinal edge and a second web layer having a first longitudinal edge and a second longitudinal edge. The second web layer is aligned to be generally coextensive with the first web layer. A longitudinal seal is provided to join the first web layer and the second web layer together. In particular, the longitudinal seal extends continuously along and is spaced a transverse distance from at least one of the first edge of the first web layer and the first edge of the second web layer. A skirt is thus formed between the longitudinal seal and the at least one first edge.

In accordance with another aspect of the invention, a series of transverse seals extending from the longitudinal seal towards the second edge of the first web layer and the second edge of the second web layer is provided. A chamber is defined within a boundary formed by the longitudinal seal and a pair of adjacent transverse seals.

In accordance with another aspect of the invention, a film is provided with a first web layer, a second web layer, and a series of transverse seals. The first web layer has a first longitudinal edge and a second longitudinal edge, and the second web layer has a first a longitudinal edge and a second longitudinal edge and is aligned to be generally coextensive with the first web layer. The series of transverse seals extend from proximate the first longitudinal edges of the first and second web layers towards the second longitudinal edges of the first and second web layers. A chamber is defined within a boundary formed by the first longitudinal edges of the first and second web layers and a pair of adjacent transverse seals. Each chamber is divided into a plurality of polygonal chamber portions. Adjacent chamber portions are interconnected by a flow passage that is in fluid communication therebetween.

In accordance with another aspect of the invention, a film is provided with a first web layer, a second web layer, a series of transverse seals, and at least one longitudinal seal segment. The first web layer has a first longitudinal edge and a second longitudinal edge, and the second web layer has a first longitudinal edge and a second longitudinal edge and is aligned to be generally coextensive with the first web layer. The series of transverse seals extend from proximate the first edge of the first web layer and the first edge of the second web layer towards the second edge of the first web layer and the second edge of the second web layer. A chamber is defined within a boundary formed by the first edge of the first web layer and the first edge of the second web layer and a pair of adjacent transverse seals. The at least one longitudinal seal segment is disposed between the adjacent transverse seals of the chamber.

These and other features of the disclosed films can be more fully understood by referring to the following detailed description and accompanying drawings. The drawings are not drawn to scale, but show only relative dimensions.

DETAILED DESCRIPTION

Figure 1A:
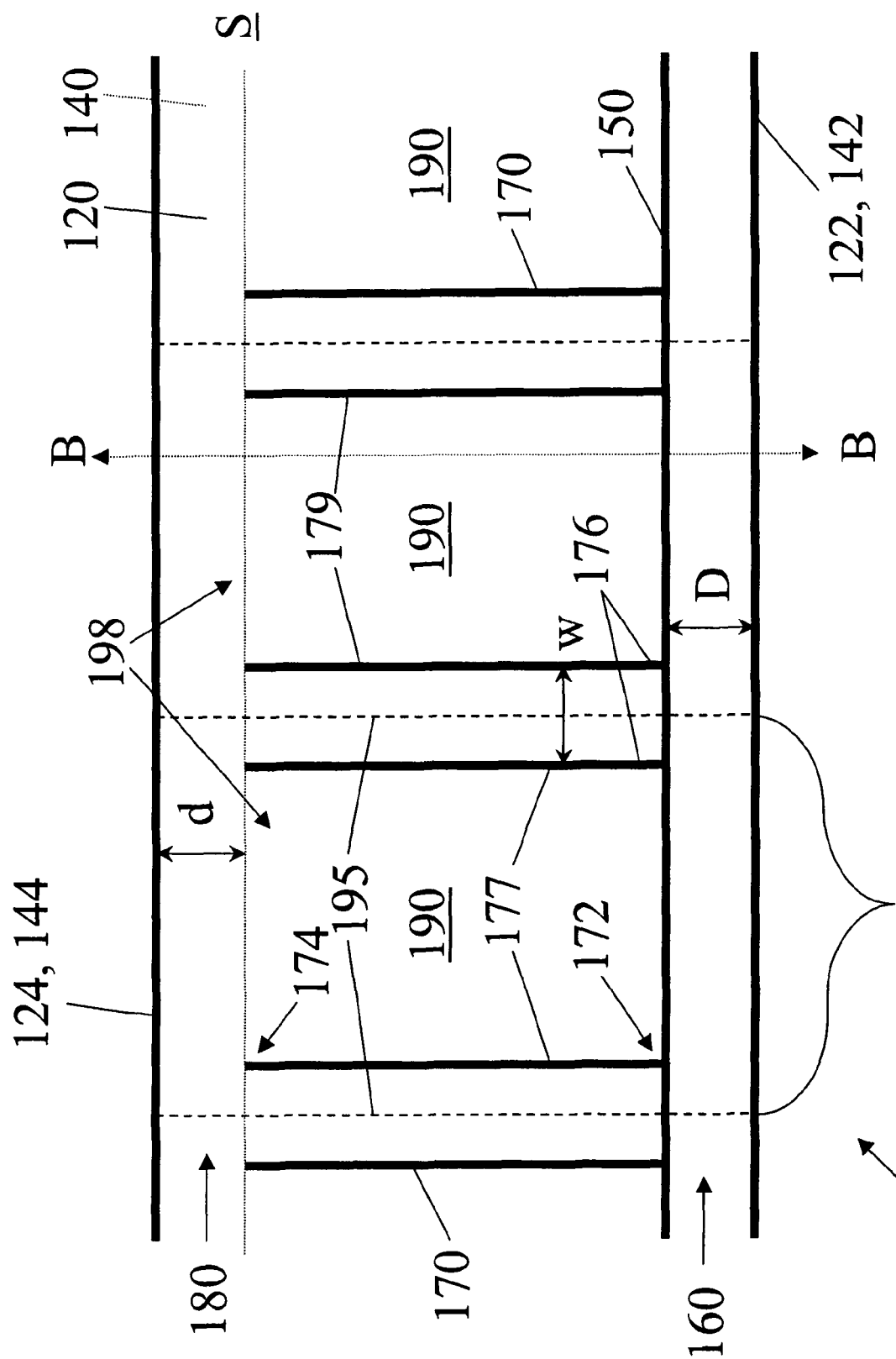
FIGS. 1A and 1B are top and side view of a representative embodiment of a film having a side inflation channel.

Illustrative embodiments will now be described to provide an overall understanding of the disclosed films. One or more examples of the illustrative embodiments are shown in the drawings. Those of ordinary skill in the art will understand that each disclosed film can be adapted and modified to provide alternative embodiments of films for other applications, and that other additions and modifications can be made to the disclosed films without departing from the scope of the present disclosure. For example, features of the illustrative embodiments can be combined, separated, interchanged, and/or rearranged to generate other embodiments. Such modifications and variations are intended to be included within the scope of the present disclosure.

Figure 1B:
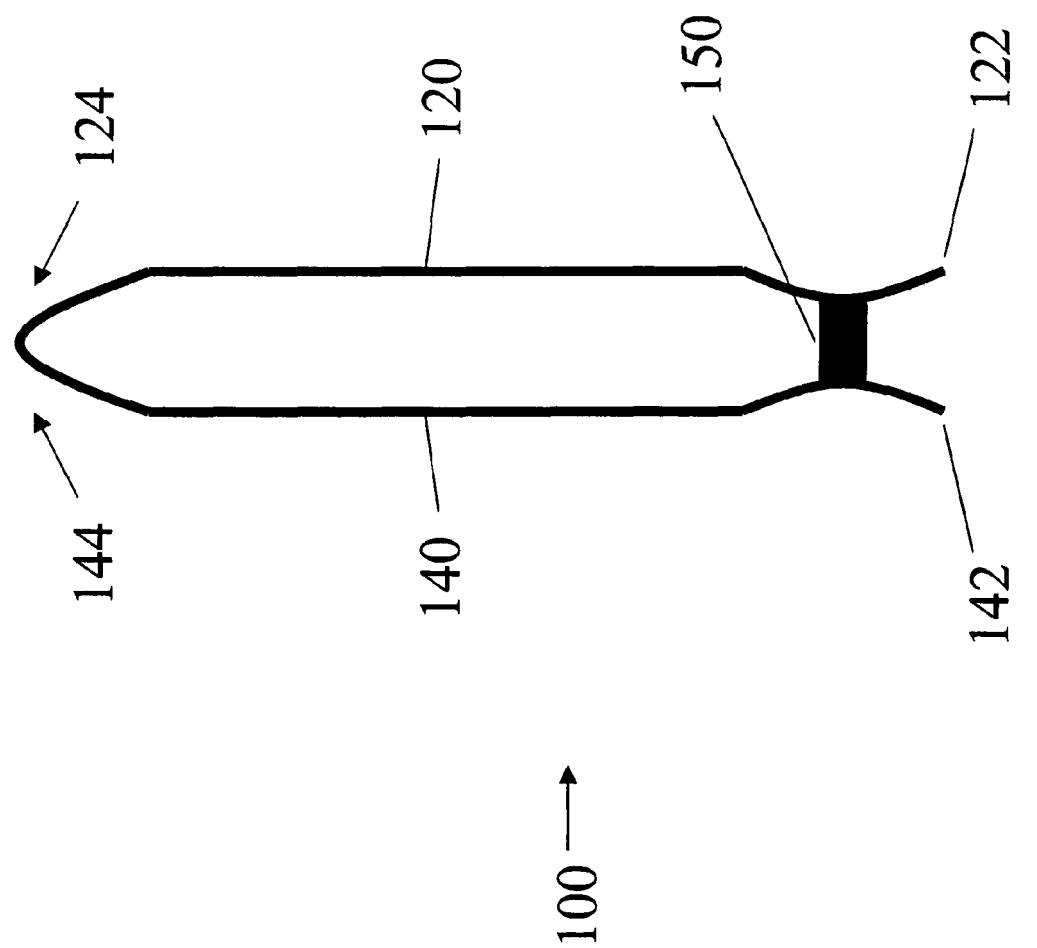

In accordance with an aspect of the invention, a film for inflatable cushions is provided. The film includes a first web layer having a first longitudinal edge and a second longitudinal edge and a second web layer having a first longitudinal edge and a second longitudinal edge. The second web layer is aligned to be generally coextensive with the first web layer. FIGS. 1A and 1B are top and side views of a representative embodiment of a film having first and second web layers joined to define a side inflation channel. As shown in FIGS. 1A and 1B, the representative film 100 includes a first web layer 120 with first and second longitudinal edges 122 and 124 and a second web layer 140 with first and second longitudinal edges 142 and 144. The first and second web layers 120 and 140 are positioned to be generally coextensive, i.e., at least respective first edges 122 and 142 are aligned with each other and/or respective second edges 124 and 144 are aligned with each other.

As shown in FIG. 1B, the aligned first edges 122 and 142 in the representative film 100 are unattached to each other, while the second edges 124 and 144 are joined together. Such a configuration can be formed from a single sheet of web material, a flattened tube of web material with one edge slit open, or two sheets of web material. For example, the first and second web layers 120 and 140 can include a single sheet of web material that is folded to define the joined second edges 124 and 144 (e.g., "c-fold film"). Alternatively for example, the first and second web layers 120 and 140 can include a tube of web material (e.g., a flattened tube) that is slit along the aligned first edges 122 and 142. Also for example, the first and second web layers 120 and 140 can include two independent sheets of web material joined, sealed, or otherwise attached together along the aligned second edges 124 and 144.

The representative film 100 can be formed from any of a variety of web materials known to those of ordinary skill in the art. Such web materials include, but are not limited to, ethylene vinyl acetates (EVAs), metallocenes, polyethylene resins, (such as low density polyethylene (LDPE), linear low density polyethylene (LLDPE), and high density polyethylene (HDPE)) and blends thereof. The disclosed films can be rolled on a hollow tube, a solid core, or folded in a fan folded box, or in another desired form for storage and shipment.

In accordance with another aspect of the invention, a longitudinal seal joining the first web layer and the second web layer together is provided. Particularly, and as embodied herein, the longitudinal seal extends continuously along and is spaced a transverse distance from at least one of the first edge of the first web layer and the first edge of the second web layer. In this manner, a skirt is formed between the longitudinal seal and the at least one first edge. For example, and as embodied herein as depicted in FIGS. 1A and 1B, the representative film 100 includes a longitudinal seal 150 that joins the first and second web layers 120 and 140 together and that extends continuously along and spaced from the aligned first edges 122 and 142. The longitudinal seal 150 is displaced a transverse distance D from the aligned first edges 122 and 142 so as to form a skirt 160 with transverse width D extending between the longitudinal seal 150 and the aligned first edges 122 and 142. If desired, the first edges 122 and 142 need not be aligned. For example, the first edge 142 of the second web layer 140 can be disposed along the longitudinal seal 150, such the skirt 160 is defined by the first web layer 120 only. As described further herein, the skirt 160 facilitates gripping of inflated cushions 190 by the user and, in some embodiments, separation of adjacent inflated cushions 190.

The longitudinal seal 150 is preferably, although not necessarily, substantially straight and extends substantially parallel to the aligned first and second edges 122 and 142. Other arrangements of the longitudinal seal 150 are also possible. For example, in some embodiments, the longitudinal seal 150 includes an undulating pattern or a zigzag pattern (as the terms undulating and zigzag are understood by those of ordinary skill in the art) that extends continuously along the first and second edges 122 and 142, thus forming a skirt 160 with a transverse width D that varies along the longitudinal extent of the film 100. Also for example, in some embodiments, the longitudinal seal 150 is inclined at an acute angle to the aligned first edges 122 and 142.

In accordance with another aspect of the invention, a series of transverse seals extending from the longitudinal seal towards the second edge of the first web layer and the second edge of the second web layer is provided. A chamber is defined within a boundary formed by the longitudinal seal and a pair of adjacent transverse seals. For example, and as embodied herein as depicted in FIG. 1A, the representative film 100 includes a series of transverse seals 170 disposed along the longitudinal extent of the film 100. Each transverse seal 170 extends from at least proximate the longitudinal seal 150 towards the joined second edges 124 and 144. Preferably, each transverse seal 170 originates from the longitudinal seal 150 and extends toward the joined second edges 124 and 144. Each transverse seal 170 has a first end 172 proximate the longitudinal seal 150 and a second end 174 proximate, but preferably spaced from, the joined second edges 124 and 144 of film 100.

Each of the transverse seals 170 embodied in FIG. 1A is substantially straight and extends substantially perpendicular to longitudinal seal 150. Other arrangements of the transverse seals 170 are also possible. For example, in some embodiments, the transverse seals 170 have undulating patterns or zigzag patterns, as further described herein.

As shown in FIG. 1A, the transverse seals 170 intersect the longitudinal seal 150 generally at right angles to define "T" shapes. Alternatively, one or more of the transverse seals 170 can intersect and extend beyond the longitudinal seal 150 to define vertices generally having "t" shapes in which a portion of each of the one or more transverse seals 170 extends below the longitudinal seal 150.

In accordance with another aspect of the invention, each transverse seal has a first end proximate the longitudinal seal and a second end spaced a transverse dimension from the second edge of the first web layer and the second edge of the second web layer. A longitudinal channel is defined in the film between the second ends of the transverse seals and the second edges of the first and second web layers. The longitudinal channel is in fluid communication with the chambers defined in the film. For example, and as embodied herein as depicted in FIG. 1A, the second ends 174 of the transverse seals 170 are spaced a transverse dimension d from the aligned second edges 124 and 144 so as to form a longitudinal channel 180 extending between the aligned second edges 124 and 144 and the second ends 174 and having a transverse width d. As further described herein, longitudinal channel 180 serves as a side inflation channel for inflatable chambers 190.

If desired, the transverse distance D and the transverse dimension d are of the same order of magnitude, which results in the skirt 160 and the longitudinal channel 180 being similarly sized. In some embodiments, the transverse distance D and the transverse dimension d are substantially equal for symmetry. Alternatively, in other embodiments, the transverse distance D is substantially smaller than the transverse dimension d. Preferably, however, the transverse distance D in such embodiments is sufficiently dimensioned so that the skirt 160 facilitates gripping and separation of adjacent inflated chambers 190.

The longitudinal seal 150 and the transverse seals 170 (as well as the longitudinal seal segments further described herein) can be formed from any of a variety of techniques known to those of ordinary skill in the art. Such techniques include, but are not limited to, adhesion, friction welding, fusion, heat sealing, laser sealing, and ultrasonic welding.

In one preferred embodiment, the second ends 174 of the transverse seals 170 are spaced a substantially uniform transverse dimension d from the aligned second edges 124 and 144. Other arrangements of the second ends 174 are also possible. For example, in some embodiments, the second ends 174 are spaced at varying transverse dimensions d from the aligned second edges 124 and 144, thus forming a longitudinal channel with a transverse width d that varies along the longitudinal extent of the film 100. In one such embodiment, one of the second ends 174 of each adjacent pair of transverse seals 170 is spaced closer to the aligned second edges 124 and 144 than the other of the second ends 174. As will be understood by those of ordinary skill in the art, such an arrangement can enhance the flow of inflation gas to the chambers 190 from inflation channel 180.

The longitudinal seal 150 and pairs of adjacent transverse seals 170 cooperatively define boundaries of inflatable chambers 190. As shown in FIG. 1A, each inflatable chamber 190 is in fluid communication with the longitudinal channel 180 via a mouth 198 opening towards the longitudinal channel 180, thus permitting inflation of the inflatable chambers 190 as further described herein.

In accordance with another aspect of the invention, a series of lines of weakness extending transversely across the first web layer and the second web layer of the film is provided. Each transverse line of weakness extends from between the first edges of the first and second web layers and the second edges of the first and second web layers. For example, and as embodied herein as depicted in FIG. 1A, the representative film 100 includes a series of lines of weakness 195 disposed along the longitudinal extent of the film 100 and extending transversely across the first and second web layers 120 and 140. Each transverse line of weakness 195 extends from at least proximate the aligned first edges 122 and 142 towards the joined second edges 124 and 144. Preferably, each transverse line of weakness 195 originates from the aligned first edges 122 and 142 and extends across the longitudinal seal 150 to the joined second edges 124 and 144 to facilitate separation of adjacent inflatable cushions.

The transverse lines of weakness 195 can include any of a variety of lines of weakness known by those of ordinary skill in the art. For example, in some embodiments, the transverse lines of weakness 195 include rows of perforations, in which a row of perforations includes alternating lands and slits spaced along the transverse extent of the row. The lands and slits can occur at regular or irregular intervals along the transverse extent of the row. Alternatively for example, in some embodiments, the transverse lines of weakness include score lines or the like formed in the web material.

The transverse lines of weakness 195 can be formed from any of a variety of techniques known to those of ordinary skill in the art. Such techniques include, but are not limited to, cutting (e.g., techniques that use a cutting or toothed element, such as a bar, a blade, a block, a roller, and a wheel) and/or scoring (e.g., techniques that reduce the strength or thickness of material in the first and second web layers 120 and 140, such as electromagnetic (e.g., laser) scoring and mechanical scoring).

Each transverse line of weakness 195 in the representative film 100 is disposed between a pair of adjacent chambers 190. More specifically, each transverse line of weakness 195 is disposed between two adjacent pairs 177 and 179 of adjacent transverse seals 170 that cooperate with the longitudinal seal 150 to define the boundaries of adjacent inflatable chambers 190.

As shown in FIG. 1A, the transverse seals 170 that are disposed adjacent to and on opposite sides of each transverse line of weakness 195 (a pair of such transverse seals is labeled 176 in FIG. 1A) are separated by a width w. In some embodiments, each pair 176 of transverse seals 170 includes a single relatively wide transverse seal of width w, rather than a pair 176 of separate relatively narrow transverse seals 170. In some of such embodiments, the transverse lines of weakness 195 are aligned with and extend through the width w of the relatively wide seals.

The representative film 100 can be inflated and sealed using any of a variety of inflation and sealing techniques known to those of ordinary skill in the art. Such techniques include inflation and sealing techniques that permit inflation of a film configuration along a side inflation channel and sealing of the resulting inflated chambers adjacent the side inflation channel such as, but not limited to, the techniques described in one or more of the U.S. patent applications previously incorporated by reference herein and U.K. patent application publication No. 2,384,459 A, which is expressly incorporated by reference herein in its entirety. In a preferred sealing technique, the resulting inflated cushions are sealed adjacent the side inflation channel and separated from the aligned second edges of the first and second web layers. For example, in one such sealing technique, after inflation of chambers 190, the first and second web layers 120 and 140 are sealed together by a longitudinal seal region S that extends continuously along, and preferably spaced from, the joined second edges 124 and 144. The film 100 is then cut, slit, or otherwise detached along the joined second edges 124 and 144. In a preferred embodiment, the inflation channel 180 is slit along the second edges 124 and 144 so as to define a second skirt 180 opposite the first skirt 160. Alternatively, the joint between the second edges 124 and 144 can be perforated or otherwise provided with a line of weakness, which is separated after inflation and sealing of the chambers. The sealing and cutting operations can be performed concurrently or consecutively. In FIG. 1A, the longitudinal seal region is schematically represented by the line labeled S. As suggested in FIG. 1A, the longitudinal seal region S joins the first and second web layers 120 and 140 together along the second ends 174 of the transverse seals 170 and the mouths 198 of the chambers 190. After inflation and sealing, film 100 thus forms inflated cushions 199, in which each such inflated cushion 199 includes a single inflated chamber 190. Strands of one or more adjacent inflated cushions 199 in film 100 can be gripped along skirt 160 and/or skirt 180 (i.e., the skirt formed between longitudinal seal region S and the slit second edges 124 and 144) and separated from each other along the transverse lines of weakness 195.

Figure 2A:
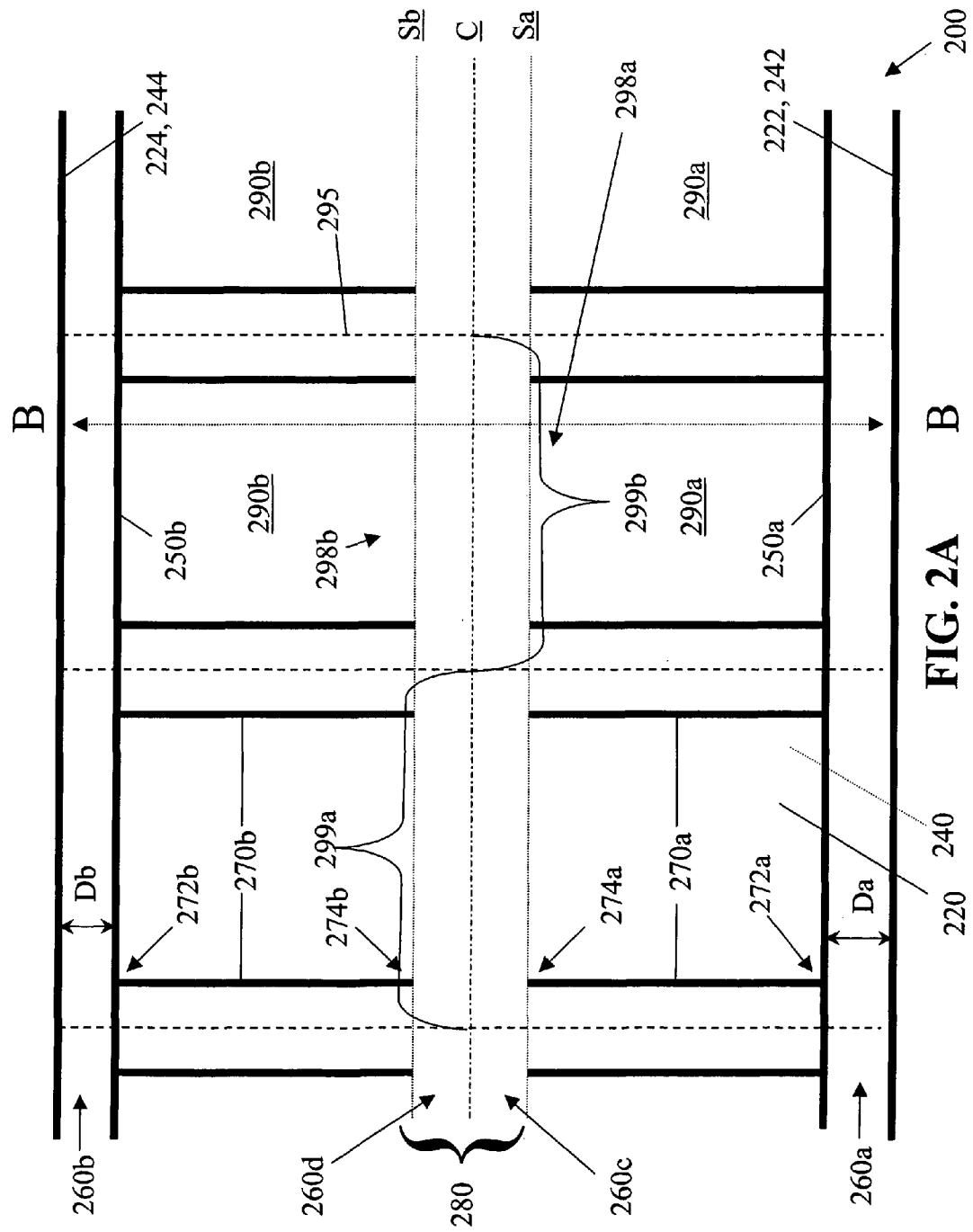
FIGS. 2A and 2B are top and side views of a representative embodiment of a film having an interior inflation channel.
Figure 2B:
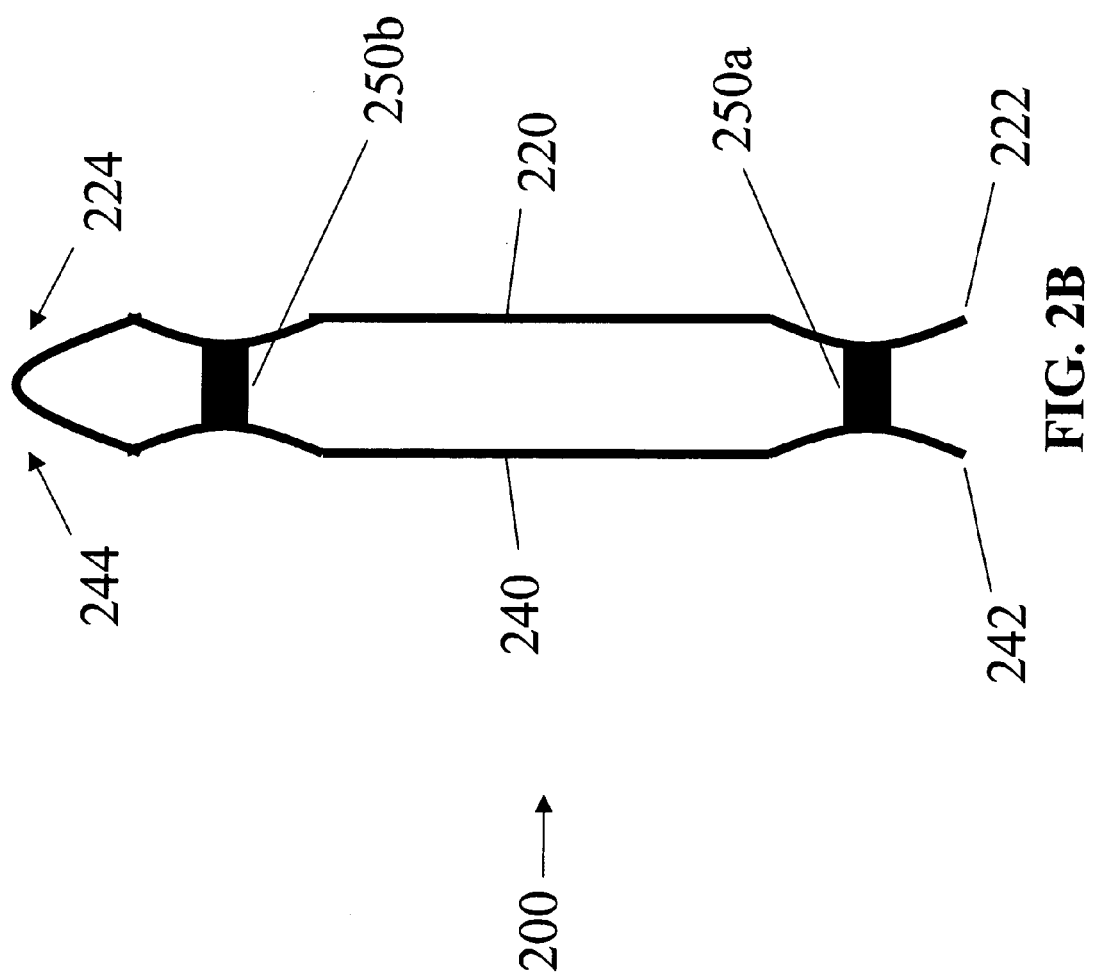

FIGS. 2A and 2B are top and side views of a representative embodiment of a film having an interior inflation channel. As shown in FIGS. 2A and 2B, the representative film 200 is similar in many respects to the representative film 100 shown in FIGS. 1A and 1B. For example, film 200 includes a first web layer 220 with first and second longitudinal edges 222 and 224 and a second web layer 240 with first and second longitudinal edges 242 and 244, in which the first and second web layers 220 and 240 are positioned with respect to each other to be generally co-extensive. Also for example, as further described herein, representative film 200 includes longitudinal seals 250a, 250b, skirts 260a, 260b, transverse seals 270a, 270b, inflatable chambers 290a, 290b with mouths 298a, 298b, and transverse lines of weakness 295. As shown in FIG. 2A, film 200 includes an interior (e.g., central) longitudinal channel 280 for inflation of chambers 290, rather than a side channel 180 as in film 100.

In accordance with another aspect of the invention, a second longitudinal seal joining the first web layer and the second web layer is provided. The second longitudinal seal extends continuously along and is spaced a transverse distance from at least one of the second edge of the first web layer and the second edge of the second web layer. A second skirt is formed between the second longitudinal seal and the at least one second edge. For example, and as embodied herein as depicted in FIG. 2A, the representative film 200 includes a first longitudinal seal 250a that extends continuously along first edges 222 and 242 and a second longitudinal seal 250b that extends continuously along second edges 224 and 244, each of which seals 250a and 250b joins the first web layer 220 to the second web layer 240. The first longitudinal seal 250a is displaced a transverse distance Da from the aligned first edges 222 and 242 to form a first skirt 260a, and the second longitudinal seal 250b is displaced a transverse distance Db from the aligned second edges 224 and 244 to form a second skirt 260b. The sizing of the transverse distances Da and Db can be selected based on the desired relative sizing of the inflatable chambers 290a, 290b. The corresponding first edges 122 and 142 and the corresponding second edges 124 and 144 can be joined together or unattached, as desired.

Further in accordance with the invention, a series of second transverse seals extending from the second longitudinal seal towards the first edge is provided. A second chamber is defined within a boundary formed by the second longitudinal seal and a pair of adjacent second transverse seals. For example, and as embodied herein as depicted in FIG. 2A, the representative film 200 also includes first and second series of transverse seals 270a and 270b joining the first and second web layers 220 and 240 together. Each first transverse seal 270a extends from the first longitudinal seal 250a towards the second edges 224 and 244, and each second transverse seal 270b extends from the second longitudinal seal 250b towards the first edges 222 and 242. Each first transverse seal 270a has a first end 272a proximate the first longitudinal seal 250a and a second end 274a spaced transversely (i.e., spaced in the direction of the second edges 224 and 244) from the first longitudinal seal 250a, and each second transverse seal 270b also has a first end 272b proximate the second longitudinal seal 250b and a second end 274b spaced transversely (i.e., spaced in the direction of the first edges 222 and 242) from the second longitudinal seal 250b. The first and second transverse seals 270a and 270b can be aligned with each other as depicted in FIG. 2A, or offset from each other as desired.

In accordance with another aspect of the invention, a longitudinal channel disposed between the first chamber and the second chamber is provided. Particularly, the longitudinal channel is defined between second ends of the first transverse seals and second ends of the second transverse seals. The longitudinal channel is in fluid communication with the first chamber and the second chamber. For example, and as embodied herein as depicted in FIG. 2A, a longitudinal channel 280 is defined between the second ends 274a and 274b of the first and second transverse seals 270a and 270b.

The first longitudinal seal 250a and pairs of adjacent first transverse seals 270a cooperatively define boundaries of first inflatable chambers 290a, and the second longitudinal seal 250b and pairs of adjacent second transverse seals 270b cooperatively define boundaries of second inflatable chambers 290b. The first and second inflatable chambers 290a and 290b are in fluid communication with the longitudinal channel 280 via mouths 298a and 298b that open towards the longitudinal channel 280; the longitudinal channel 280 is disposed between the first and second inflatable chambers 290a and 290b.

The representative film 200 can be inflated and sealed using any of a variety of inflation and sealing techniques known to those of ordinary skill in the art. Such techniques include inflation and sealing techniques that permit inflation of a film configuration along an interior (e.g., central) inflation channel and sealing of the resulting inflated chambers adjacent the interior channel, such as, but not limited to, those techniques described in the one or more of the patent applications previously incorporated by reference herein. As used herein, the term "interior inflation channel" can be understood to include an inflation channel that separates two adjacent strands of inflatable chambers. In a preferred sealing technique, the resulting inflated chambers are sealed adjacent the interior inflation channel and separated from the aligned second edges of the first and second web layers. For example, in one such sealing technique, after inflation of chambers 290a and 290b, the first and second web layers 220 and 240 are sealed together along longitudinal seal regions Sa and Sb that extend continuously along the longitudinal extent of film 200, and the film 200 is cut, slit, or otherwise detached along a detachment region C disposed between the longitudinal seal regions Sa and Sb. In a preferred embodiment, the inflation channel 280 is slit along the detachment region C so as to define second skirts 260c,d opposite the first skirts 260a,b. Alternatively, the detachment region C can be perforated or otherwise provided with a line of weakness, which is separated after inflation and sealing of the chambers 290. As suggested in FIG. 2A, the longitudinal seal region Sa joins the first and second web layers 220 and 240 together along the second ends 274a of the transverse seals 270a and the mouths 298a, and the longitudinal seal region Sb joins the first and second web layers 220 and 240 together along the second ends 274b of the transverse seals 270b and the mouths 298b. After inflation and sealing, film 200 forms inflated cushions 299a and 299b, in which each such inflated cushion 299a and 299b includes a single inflated chamber 290a and 290b. Strands of adjacent inflated cushions 299a and 299b can be gripped along skirt 260a and/or skirt 260c (i.e., the skirt formed between the longitudinal seal region Sa and the detachment region C) and skirt 260b and/or skirt 260d (i.e., the skirt formed between the longitudinal seal region Sb and the detachment region C), respectively, and separated from each other along the transverse lines of weakness 295.

FIGS. 3A-3E are top views of alternative embodiments of film configurations in accordance with the invention having longitudinal seal segments disposed between transverse seals. While the alternative embodiments are described with respect to the representative film of FIGS. 1A and 1B, those of ordinary skill in the art will understand that one or more of the features of the alternative embodiments can also be combined with the representative film shown in FIGS. 2A and 2B. Furthermore, the seal arrangements of FIGS. 3A-3E can be used with conventional c-fold or flattened tube film configurations, if desired.

As shown in FIGS. 3A-3E, representative film 300 is similar in many respects to the representative film 100 shown in FIGS. 1A and 1B. For example, film 300 includes a first web layer 320 with first and second longitudinal edges 322 and 324 and a second web layer 340 with first and second longitudinal edges 342 and 344, in which the first and second web layers 320 and 340 are positioned with respect to each other to be generally co-extensive. Also for example, representative film 300 includes a longitudinal seal 350, transverse seals 370, a side inflation channel 380, inflatable chambers 390 with mouths 398 opening towards the side inflation channel 380, and transverse lines of weakness 395, as well as a skirt 360 if desired. The transverse seals 370 can be disposed at equal, unequal, or random intervals along the longitudinal extent of film 300.

In accordance with another aspect of the invention, at least one longitudinal seal segment disposed between a pair of adjacent transverse seals of a chamber is provided. The at least one longitudinal seal segment defines chamber portions within the chamber with a flow passage between adjacent chamber portions. For example, and as embodied herein and depicted in FIGS. 3A-3E, film 300 also includes longitudinal seal segments 352 joining the first and second web layers 320 and 340 together. The longitudinal seal segments 352 are disposed between the transverse seals 370 of the chambers 390 and define chamber portions 392 and connecting flow passages 394. The chamber portions 392 shown in FIGS. 3A-3E, as well as the chamber portions shown in FIGS. 4, 5, 6A, and 6B, are polygonal.

As shown in FIGS. 3A-3E, each chamber 390 in film 300 includes longitudinal seal segments 352 disposed along the transverse extent of the chamber 390. Generally, the chamber portions 392 and the flow passages 394 defined by the longitudinal seal segments 352 can facilitate the distribution of shock loads on the inflated chambers 390, thereby enhancing the void-fill and performance properties of inflated chambers 390. As will be understood by those of ordinary skill in the art, and as suggested in FIG. 3A, the flow passages 394 enable air (or gas) volume and pressure in a first chamber portion, e.g., chamber portion 391, to be transmitted to chamber portions connected thereto via flow passages 394, e.g., chamber portions 396, for distributing a shock load disposed on or near the first chamber portion 391 along the interconnected chamber portions 396. The flow passages 394 also facilitate bending, creasing, or folding of the inflated chambers 390 along lines passing through the flow passages 394 for enabling inflated film 300 to conform to the shapes of objects packaged therein.

As shown in FIGS. 3A-3E, each longitudinal seal segment 352 is disposed between a pair of transverse seals 370 that cooperate with longitudinal seal 350 to define the boundary of an inflatable chamber 390. Each longitudinal seal segment 352 includes a transverse width and a pair of opposite ends 354 and 356 separated from each other by a longitudinal dimension. If offset from an adjacent transverse seal 370, as depicted in FIGS. 3A-3E, the ends 354 and 356 preferably include rounded or otherwise smooth corners (i.e., terminal portions) to inhibit or prevent accumulation of air (or gas) volume and pressure in the region of the corners and thereby facilitate distribution of shock loads among chamber portions 392. Each flow passage 394 includes a longitudinal dimension that is less than the longitudinal dimension of the longitudinal seal segments 352, but sufficiently large to permit distribution of shock loads (e.g., air passage) among chamber portions 392. The longitudinal seal segments 352 of the preferred embodiment are substantially straight and extend substantially parallel to the longitudinal seal 350.

Figure 3A:
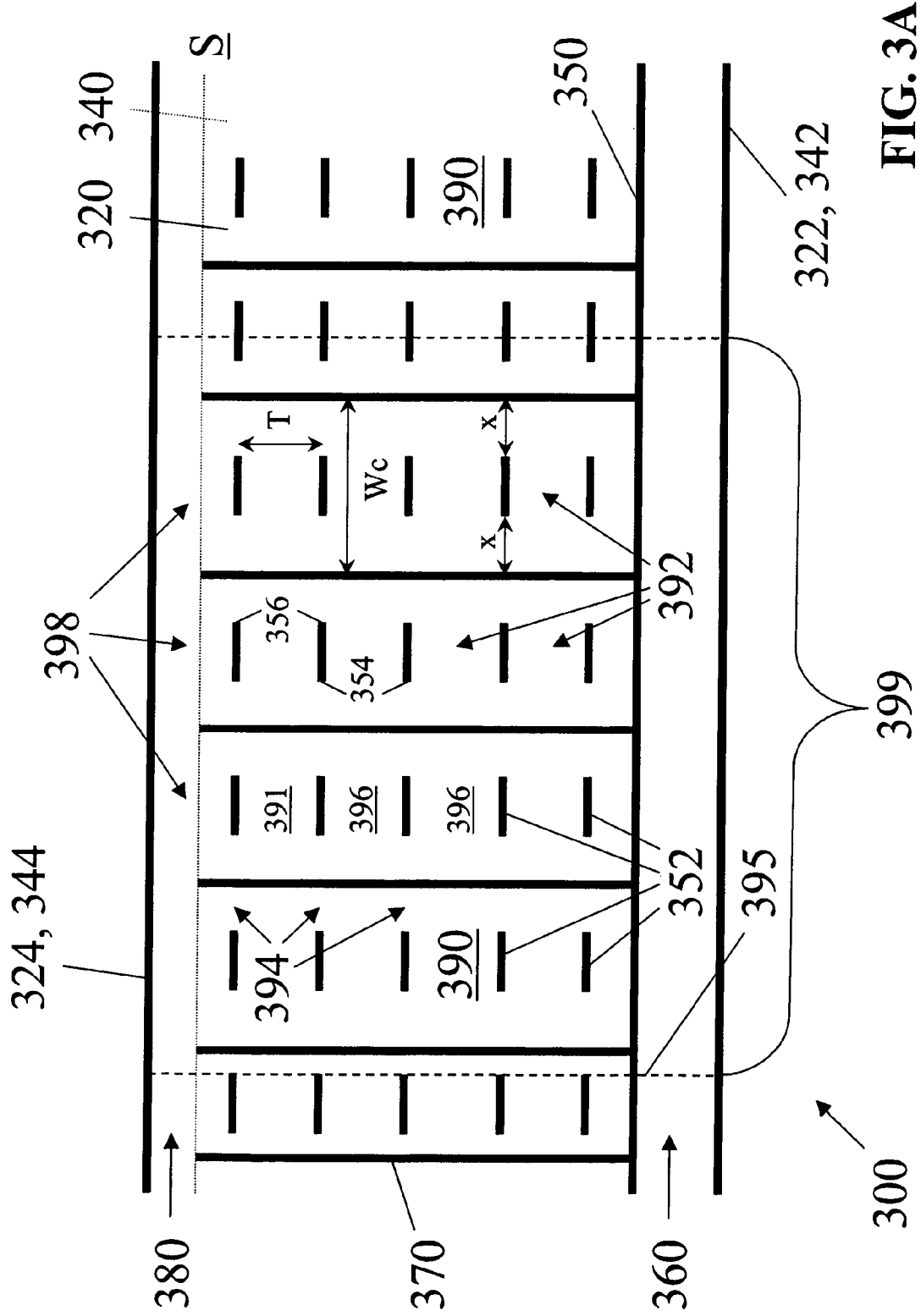
FIGS. 3A-3E are top views of alternative embodiments of the film of the present invention having longitudinal seal segments disposed between transverse seals.
Figure 3B:
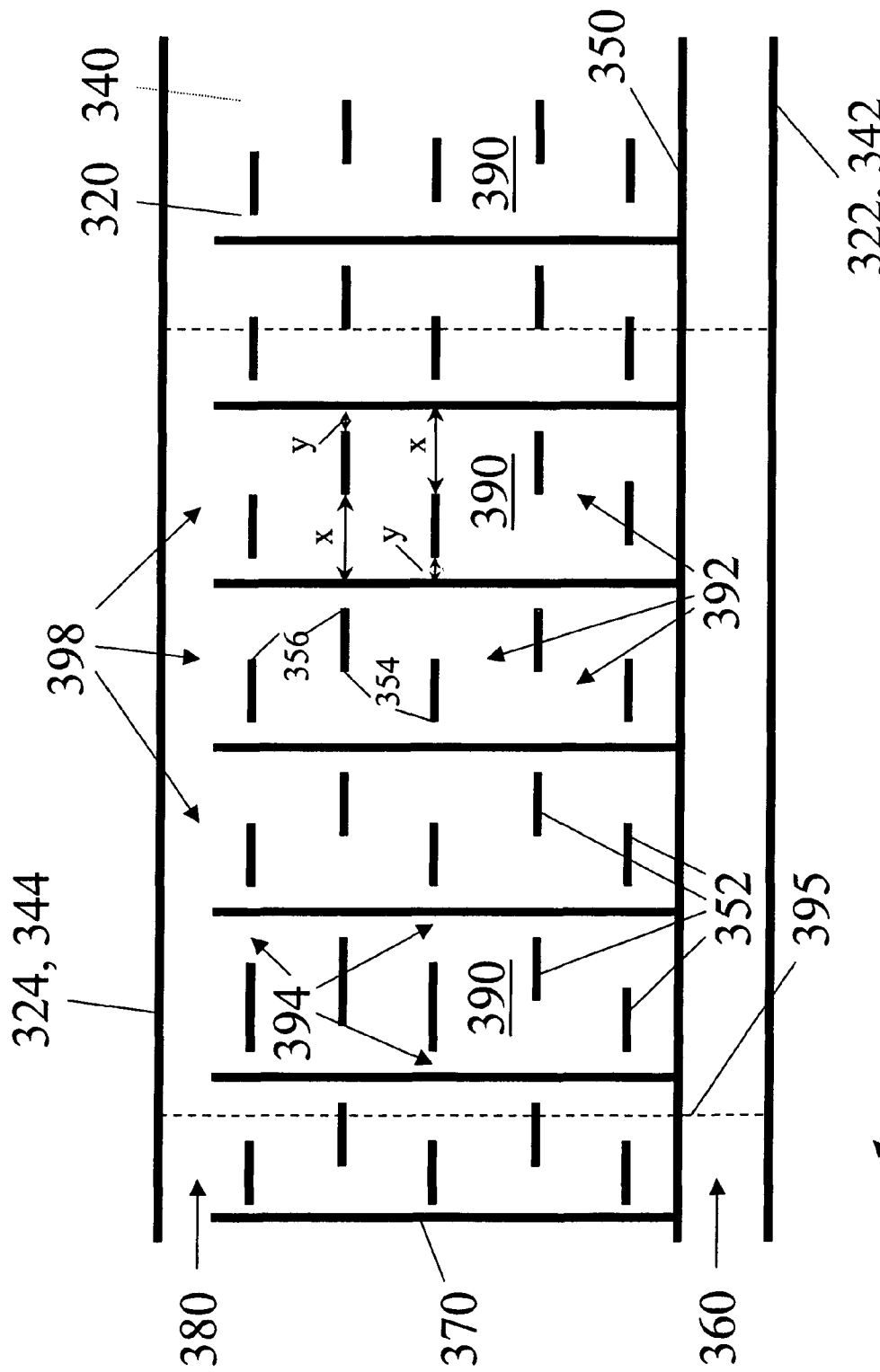

As shown in FIG. 3A, the longitudinal seal segments 352 in each chamber 390 are centrally disposed between and equally spaced from each transverse seal 370 of the chamber 390 by longitudinal distances x. Other arrangements of the longitudinal seal segments 352 in a chamber 390 are possible. For example, as shown in FIG. 3B, the longitudinal seal segments 352 can be interleaved or staggered within the chamber 390, so that the ends 354, 356 are spaced at varying longitudinal distances x and y from the ends 354, 356 of the longitudinal seal segments 352 to the transverse seals 370, wherein x≠y. Also for example, as shown in FIG. 3C, the longitudinal seal segments 352 can be disposed nearer to one of the transverse seals 370 of the chamber 390, such that x>y.

Figure 3C:
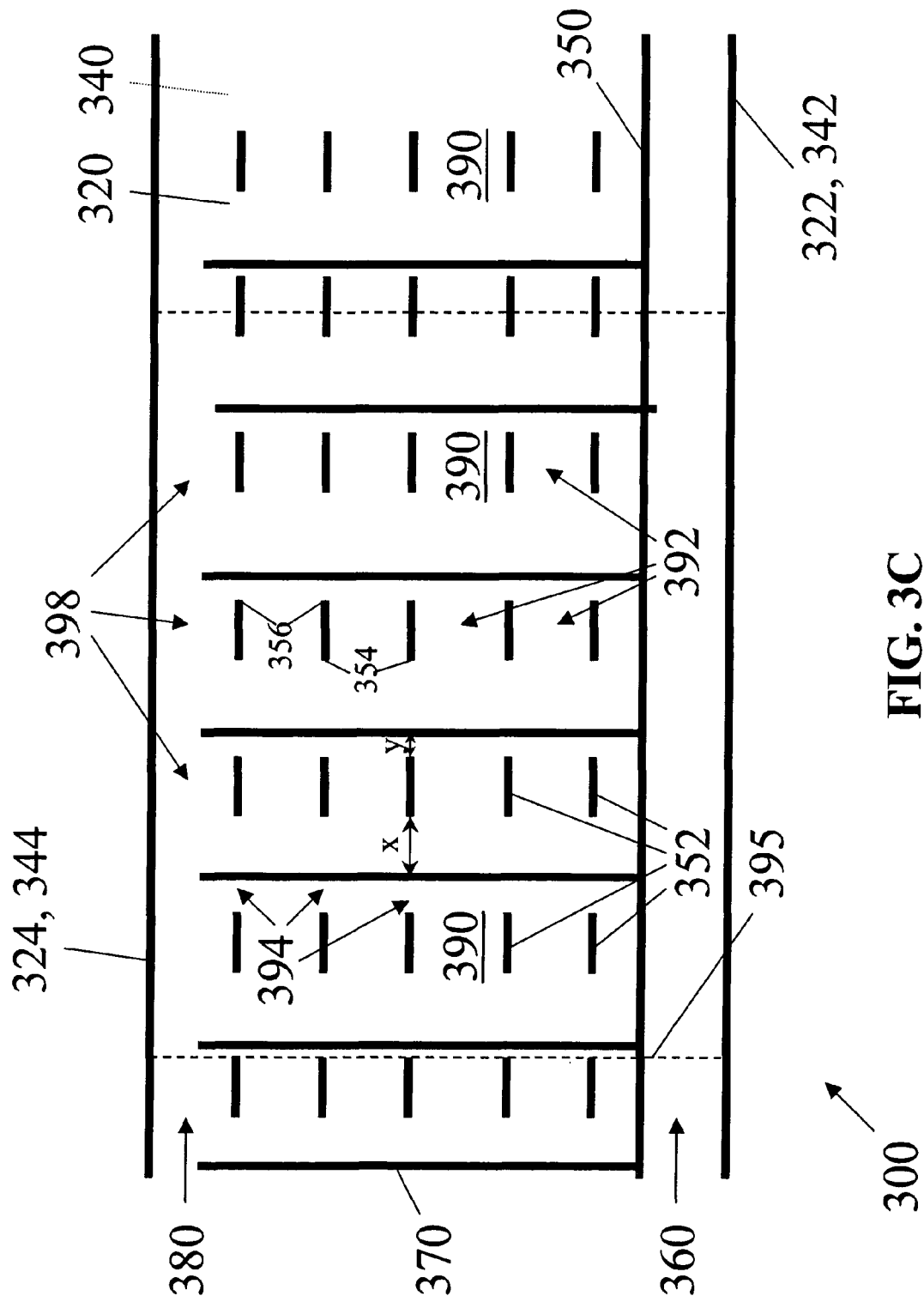
Figure 3D:
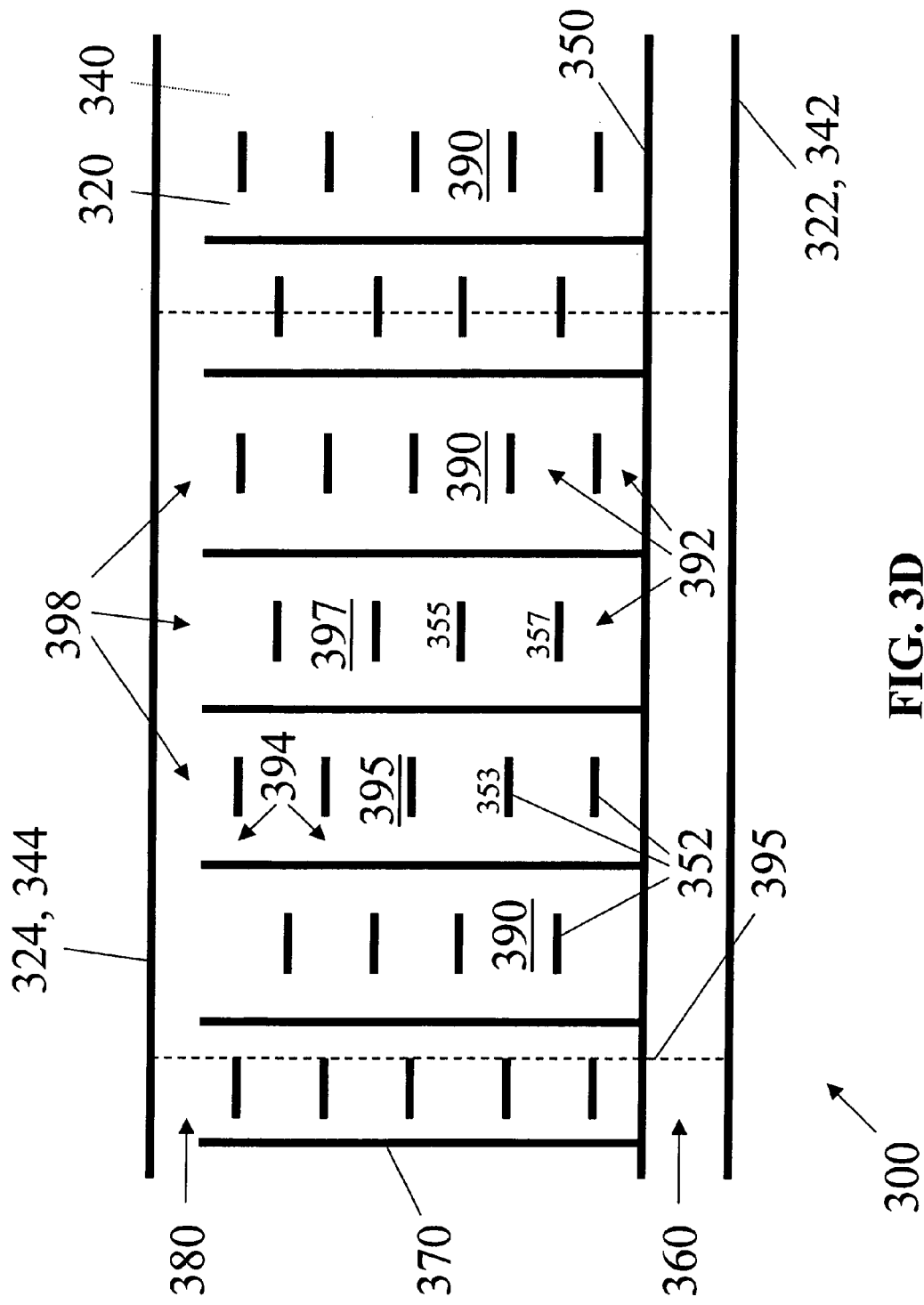

As shown in FIG. 3A-3C, the longitudinal seal segments 352 are disposed in the chambers 390 at substantially uniform transverse intervals, so that each longitudinal seal segment 352 in a chamber 390 is transversely aligned with a longitudinal seal segment 352 in each other chamber 390. In some embodiments, such as the embodiment shown in FIG. 3A, the longitudinal seal segments 352 are distributed at a transverse interval T that is substantially equal to the longitudinal dimension Wc of chamber 390 to form substantially square chamber portions. Other arrangements of the longitudinal seal segments 352 in the chambers 390 are also possible. For example, as shown in FIG. 3D, the longitudinal seal segments 352 can be disposed in the chambers 390 such that at least one longitudinal seal segment (e.g., segment 353) in a chamber (e.g., chamber 395) is transversely offset between a pair of adjacent longitudinal seal segments (e.g., segments 355 and 357) of an adjacent chamber (e.g., chamber 397).

The representative film 300 shown in FIGS. 3A-3E can be inflated and sealed using the inflation and sealing techniques previously described herein. For example, as suggested in FIG. 3A, the first and second web layers 320 and 340 can be sealed together along a longitudinal seal region S, and then slit, cut, or otherwise detached, such as by use of perforations or the like, along the joined second edges 324 and 344. After inflation and sealing, film 300 forms inflated cushions 399, in which each such inflated cushion 399 includes at least one and, preferably, more than one independent inflated chamber 390, and each independent inflated chamber 390 includes chamber portions 392 and flow passages 394. Adjacent inflated cushions 399 can be gripped along skirt 360a if provided and/or skirt 380 (i.e., the skirt formed between longitudinal seal region S and the slit second edges 324 and 344) and separated from each other along the transverse lines of weakness 395.

As shown in FIGS. 3A-3E, the longitudinal seal segments 352 define mouths 398 of the inflatable chambers 390, wherein the mouths 398 permit fluid communication with inflation channel 380. In some embodiments, the longitudinal seal segments 352 include longitudinal seal segments disposed proximate the mouths 398.

Figure 3E:
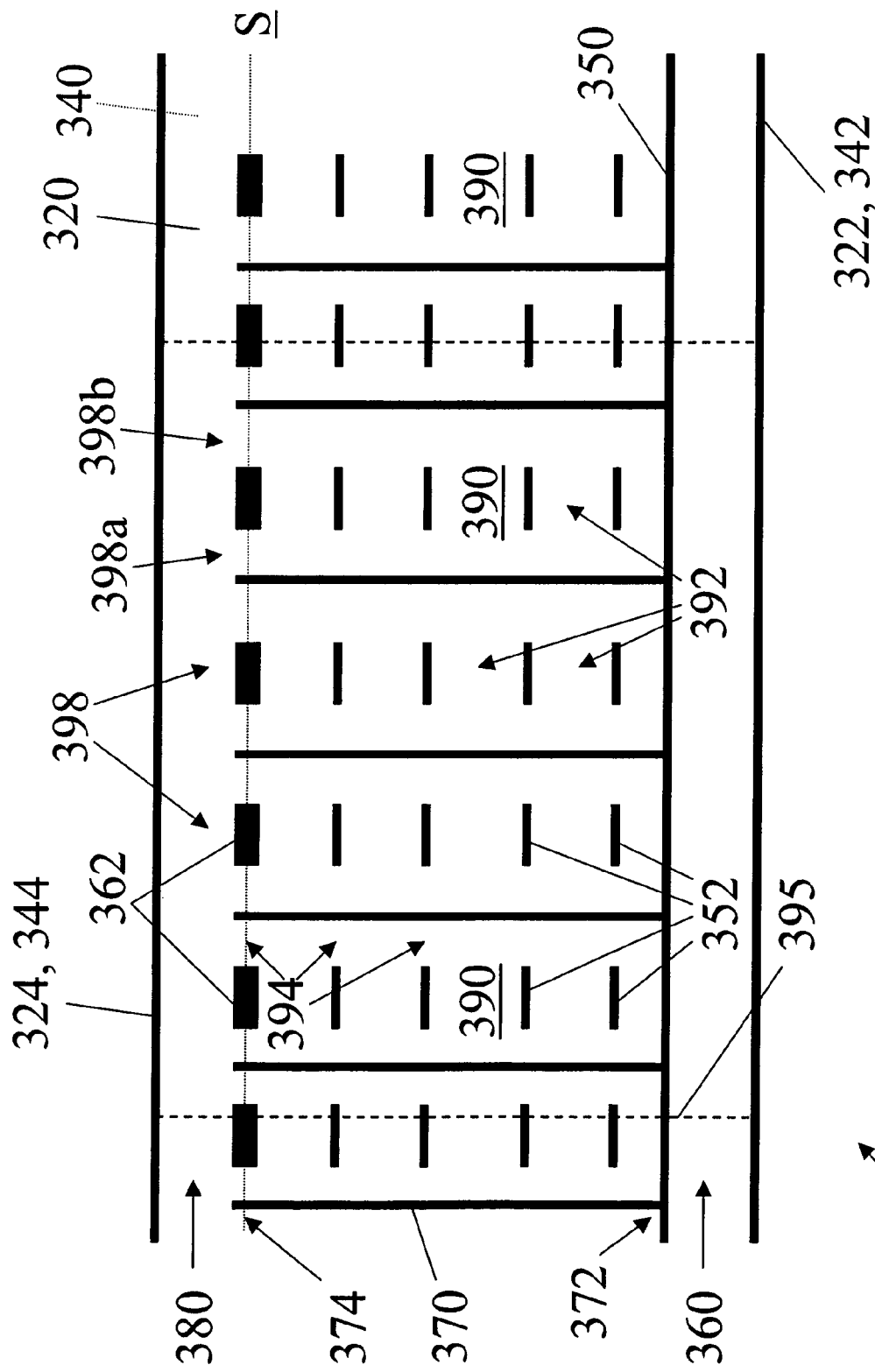

In accordance with another aspect of the invention, at least one longitudinal seal segment disposed proximate the mouth of a chamber is provided. For example, and as embodied herein as depicted in FIG. 3E, the longitudinal seal segments 352 include longitudinal seal segments 362 that are disposed proximate the mouths 398 of chambers 390 and offset from (e.g., centrally disposed between) transverse seals 370. Each longitudinal seal segment 362 is approximately transversely aligned with the second ends 374 of a pair of transverse seals 370 of a chamber 390. Preferably, each longitudinal seal segment 362 has a transverse width that is greater than the transverse widths of the longitudinal seal segments 352 disposed within the chamber 390. Preferably, the longitudinal seal segments 362 are provided with rounded or smooth corners as previously described. The larger transverse width of the longitudinal seal segment 362 facilitates the eventual sealing of the mouths 398 of the chamber 390 along longitudinal seal region S after inflation of chambers 390.

Generally, the longitudinal seal region S interconnects the longitudinal seal segments 362. In some embodiments, the longitudinal seal region S intersects a central portion of the longitudinal seal segments 362. For example, in a preferred embodiment as shown in FIG. 3E, the longitudinal seal region S approximately bisects the longitudinal seal segments 362, although other intersecting arrangements of the longitudinal seal region S and the longitudinal seal segments 362 are also possible.

As with the embodiments of FIGS. 1A and 1B, a series of lines of weakness is provided. If desired, pairs of transverse seals 370 can be provided in the embodiments of FIGS. 3A-3E, such that the lines of weakness are disposed between adjacent pairs of transverse seals 370 as shown in FIG. 1A. As shown in FIG. 3E, each line of weakness 395 can intersect a particular chamber 390, thereby rendering that particular chamber 390 incapable of being inflated. Alternatively, and as previously described, the lines of weakness 395 can be aligned with selected transverse seals 370. If desired, the transverse seals 370 of film 300 shown in FIGS. 3A-3E can include at least some relatively narrow seals and at least some relatively wide seals 370. Each line of weakness 395 is thus aligned with and extends through a relatively wide transverse seal 370 without intersecting the chambers 390 adjacent to the relatively wide seal 370, thereby preserving the capability of the adjacent chambers 390 to be inflated. Such an arrangement of transverse seals and transverse lines of weakness can be applied to each of the films disclosed herein.

As shown in FIG. 3E, the second ends 374 of the pair of adjacent transverse seals 370 of a chamber 390 and the longitudinal seal segment 362 disposed proximate the mouth of the chamber 390 cooperatively define two independent entrance ports 398a and 398b to the chamber 390 from inflation channel 380. As such, each inflatable chamber 390 is in fluid communication with inflation channel 380 via two independent fluid flow paths. Moreover, each inflatable chamber 390 is in fluid communication with each other inflatable chamber 390 via two independent fluid flow paths.

Other arrangements of entrance ports to the inflatable chambers from the inflation channel or between adjacent chamber portions are also possible. For example, in some embodiments, each chamber can include two or more longitudinal seal segments disposed proximate the mouth of the chamber, in which the longitudinal seal segments and the second ends of the pair of adjacent transverse seals of each chamber define three or more entrance ports into the chamber.

As shown in FIGS. 3A-3E, the transverse lines of weakness 395 are disposed at random longitudinal intervals in film 300 relative to the transverse seals 370. As such, the transverse lines of weakness 395 can extend through a chamber 390 (e.g., through the longitudinal seal segments 352 and 362 in the chamber 390). Alternatively, the transverse lines of weakness 395 can be disposed at regular longitudinal intervals in film 300 relative to the transverse seals 370, similar to the intervals shown and described with respect to FIGS. 1A, 1B, 2A, and 2B.

Figure 4:
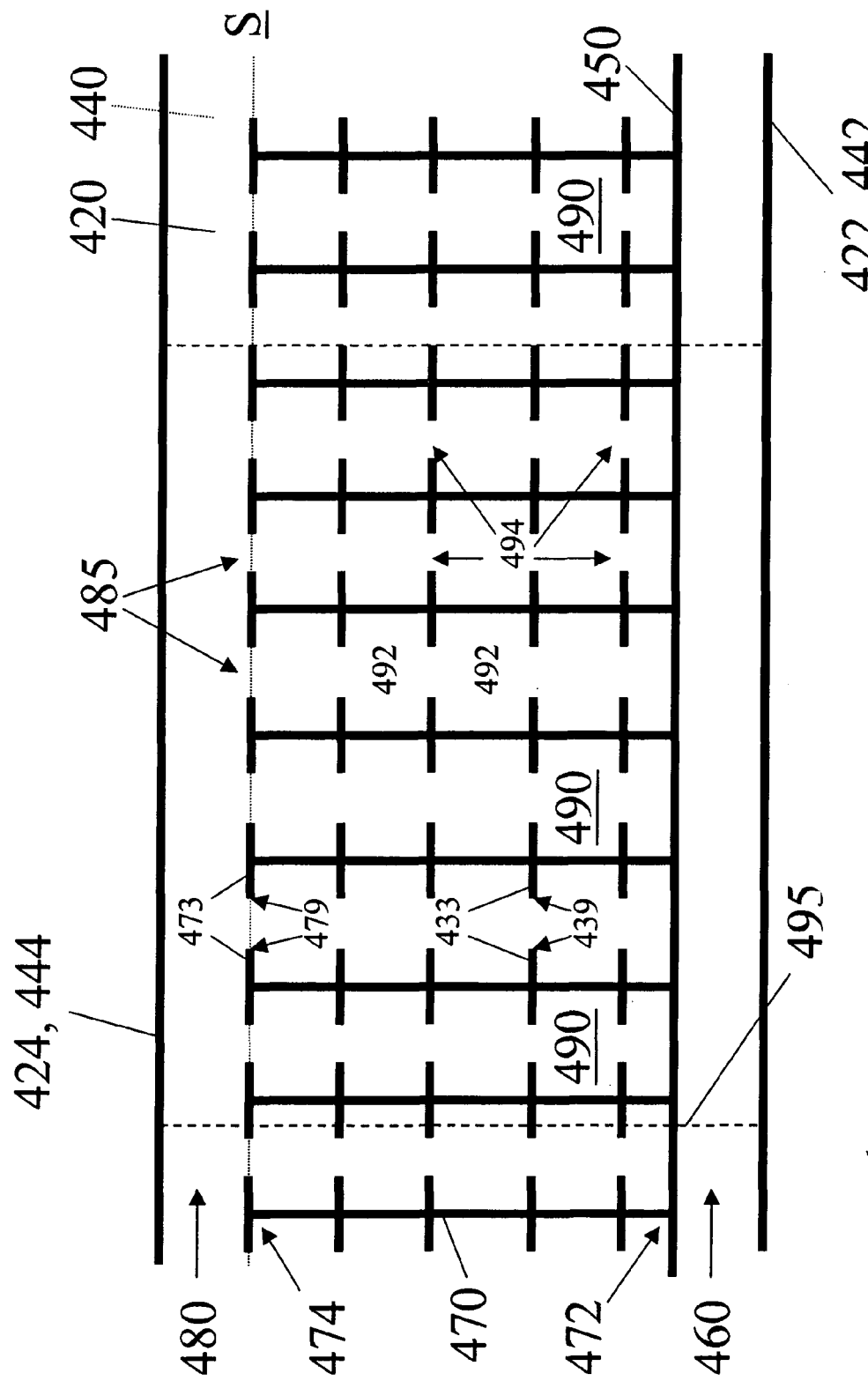
FIG. 4 is a top view of an alternative embodiment of the film of the present invention having longitudinal seal segments extending from the transverse seals.

FIG. 4 is a top view of an alternative embodiment of the film in accordance with another aspect of the invention having longitudinal seal segments extending from transverse seals. While the alternative embodiment is described with respect to the representative film of FIGS. 1A and 1B, one or more of the features of the alternative embodiment can also be combined with the representative film shown in FIGS. 2A and 2B. Alternatively, conventional c-fold or flattened tube configurations can be used, such that no skirt is provided.

As shown in FIG. 4, representative film 400 is similar in many respects to the representative film 100 shown in FIGS. 1A and 1B and the representative film 300 shown in FIGS. 3A-3E. For example, film 400 includes a first web layer 420 with first and second longitudinal edges 422 and 424 and a second web layer 440 with first and second longitudinal edges 442 and 444, in which the first and second web layers 420 and 440 are positioned with respect to each other to be generally co-extensive. Also for example, representative film 400 includes a longitudinal seal 450, transverse seals 470 with first and second ends 472 and 474, an inflation channel 480, inflatable chambers 490 opening towards the side inflation channel 480, and transverse lines of weakness 495, as well as a skirt 460 if desired.

In accordance with another aspect of the invention, at least one longitudinal seal segment that extends from at least one transverse seal is provided. For example, and as embodied herein and depicted in FIG. 4, representative film 400 also includes longitudinal seal segments 433 that extend from the transverse seals 470 of the chambers 490 and define chamber portions 492 and connecting flow passages 494.

Each longitudinal seal segment 433 extends from one of the transverse seals 470 of a chamber 490 and includes a corner (i.e., a terminal portion) 439 that is disposed opposite the transverse seal 470. Preferably, the terminal portions 439 are rounded or otherwise smooth to inhibit or prevent the accumulation of air (or gas) volume or pressure in the region of the terminal portions 439. As shown in FIG. 4, the longitudinal seal segments 433 preferably include longitudinal seal segments 473 disposed proximate the second ends 474 of the transverse seals. Each longitudinal seal segment 473 extends from the second end 474 of one of the transverse seals 470 of a chamber 490 and includes a corner (i.e., a terminal portion) 479 opposite the second end 474. The terminal portions 479 of the longitudinal seal segments 473 of a chamber 490 cooperatively define an entrance port 485 to the chamber 490 from the longitudinal inflation channel 480. Preferably, the entrance ports 485 have longitudinal dimensions that are substantially equal to the longitudinal dimensions of the flow passages 494, but less than the longitudinal dimensions of the longitudinal seal segments 433 and 473. The longitudinal seal segments 473 facilitate the eventual sealing of the entrance ports 485 of the chambers 490 along longitudinal seal region S after inflation. Like the longitudinal seal segments 362 in FIG. 3E, the longitudinal seal segments 473 can also include enhanced or increased transverse widths to further facilitate sealing of the entrance ports 485.

As shown in FIG. 4, the longitudinal seal segments 433 and 473 include substantially equal longitudinal dimensions and are disposed at substantially uniform transverse intervals in film 400. Other arrangements and sizes of the longitudinal seal segments 433 and 473 are also possible. For example, in some embodiments, the longitudinal dimensions of the longitudinal seal segments 433 are different than the longitudinal widths of the longitudinal seal segments 473. Also for example, in some embodiments, the longitudinal seal segments 433 and/or 473 are interleaved or staggered in film 400, similar to the interleaving of the longitudinal seal segments 352 in film 300 of FIGS. 3B and 3D.

Figure 5:
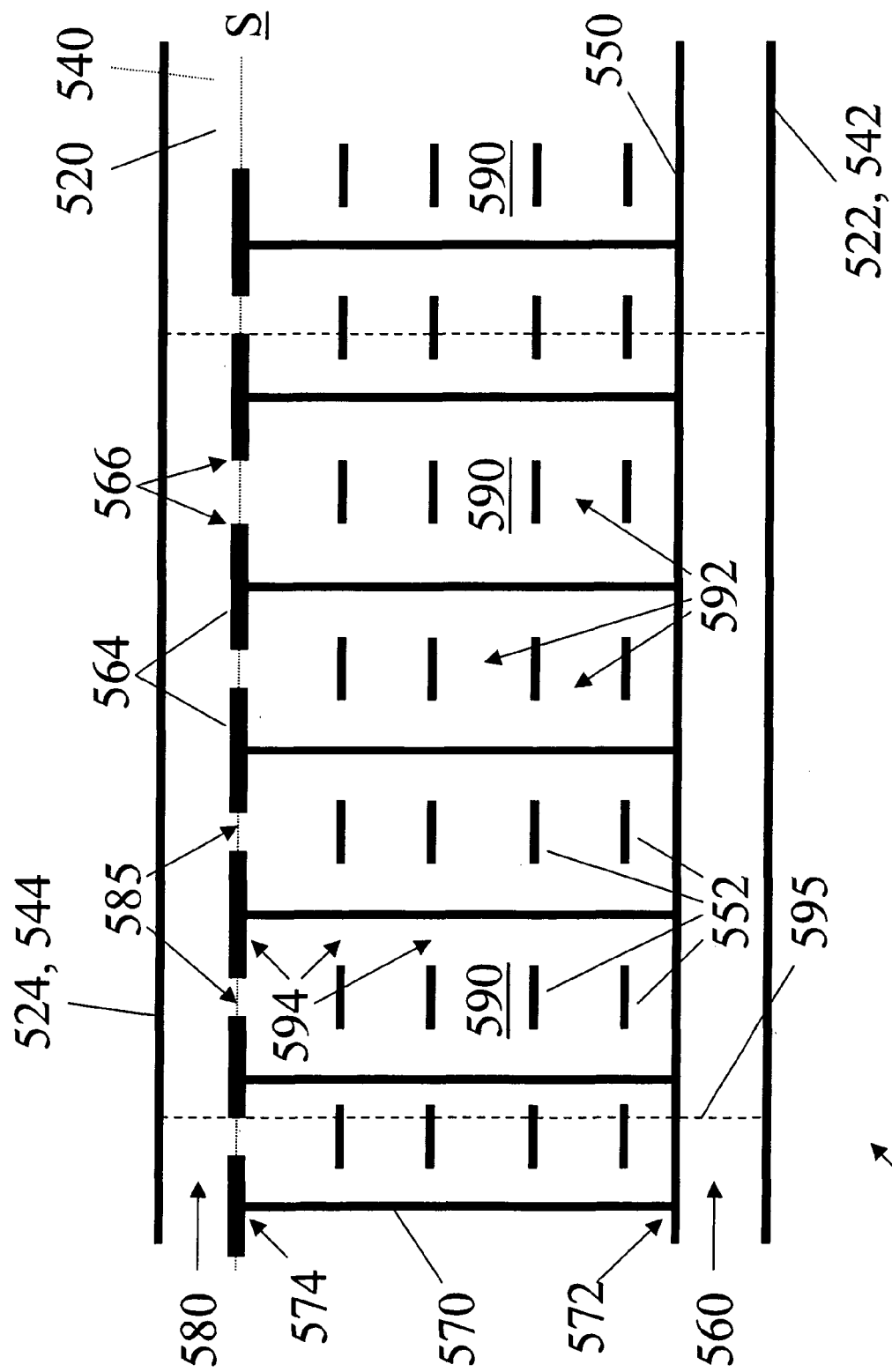
FIG. 5 is a top view of an alternative embodiment of the film of the present invention having longitudinal seal segments disposed between transverse seals and longitudinal seal segments extending from the transverse seals.

FIG. 5 is a top view of an alternative embodiment of the film shown in FIGS. 1A and 1B having longitudinal seal segments disposed between transverse seals and longitudinal seal segments extending from the transverse seals. While the alternative embodiment is described with respect to the representative film of FIGS. 1A and 1B, one or more of the features of the alternative embodiment can also be combined with the representative film shown in FIGS. 2A and 2B. Alternatively, conventional c-fold or flattened tube film configurations can be used, such that no skirt is provided.

As shown in FIG. 5, representative film 500 is similar in many respects to the representative film 100 shown in FIGS. 1A and 1B and the representative film 300 shown in FIGS. 3A-3E. For example, film 500 include a first web layer 520 with first and second longitudinal edges 522 and 524 and a second web layer 540 with first and second longitudinal edges 542 and 544, in which the first and second web layers 520 and 540 are positioned with respect to each other to be generally co-extensive. Also for example, representative film 500 includes a longitudinal seal 550, transverse seals 570 with first and second ends 572 and 574, an inflation channel 580, inflatable chambers 590 that open towards the inflation channel 580, and transverse lines of weakness 595, as well as a skirt 560 if desired. Further, representative film 500 includes longitudinal seal segments 552 disposed between the transverse seals 570 of the chambers 590 and defining chamber portions 592 and connecting flow passages 594. As shown in FIG. 5, representative film 500 also includes longitudinal seal segments 564 that extend from the second ends 574 of the transverse seals 570.

Each longitudinal seal segment 564 extends from the second end 574 of one of the pair of transverse seals 570 of a chamber 590 and includes a corner (i.e., a terminal portion) 566 that is disposed opposite the second end 574. Preferably, the terminal portions 566 are rounded or otherwise smooth to inhibit or prevent the accumulation of air (or gas) volume or pressure in the region of the terminal portions 566. The terminal portions 566 of a chamber 590 cooperatively define an entrance port 585 to the chamber 590 from the longitudinal inflation channel 580. Preferably, the entrance port 585 has a longitudinal dimension that is less than the longitudinal dimension of the longitudinal seal segments 552 and greater than the longitudinal width of the flow passages 594. Also preferably, each longitudinal seal segment 564 includes a transverse width that is greater than the transverse widths of the longitudinal seal segments 552. As will be understood by those of ordinary skill in the art, the increased transverse width of the longitudinal seal segment 564 facilitates the eventual sealing of the entrance ports 585 of the chambers 590 along longitudinal seal region S after inflation.

FIGS. 6A-6D are top views of alternative embodiments of the film shown in FIGS. 1A and 1B having transverse seals with zigzag patterns. While the alternative embodiments are described with respect to the representative film of FIGS. 1A and 1B, one or more of the features of the alternative embodiments can also be combined with the representative film shown in FIGS. 2A and 2B. Alternatively, conventional c-fold or flattened tube film configurations can be used, such that no skirt is provided.

As shown in FIGS. 6A-6D, representative film 600 is similar in many respects to the representative film 100 shown in FIGS. 1A and 1B. For example, film 600 include a first web layer 620 with first and second longitudinal edges 622 and 624 and a second web layer 640 with first and second longitudinal edges 642 and 644, in which the first and second web layers 620 and 640 are positioned with respect to each other to be generally co-extensive. Also, representative film 600 includes a longitudinal seal 650, transverse seals 670 with first and second ends 672 and 674, an inflation channel 680, inflatable chambers 690 that open towards the inflation channel 680, and transverse lines of weakness 695, as well as a skirt 660 if desired.

As previously described with respect to representative film 100 shown in FIGS. 1A and 1B, skirt 660 can facilitate gripping of inflated chambers 690 and, in some embodiments, separation of adjacent inflated chambers 690. Generally, the degree to which a skirt facilitates gripping and separation of inflated chambers depends on the transverse extent of the film from which the chambers are formed. If provided, the skirt facilitates separation of inflated chambers formed from films having relatively large transverse widths (e.g., widths of 36 inches or more) to a greater degree than inflated chambers formed from films having relatively small transverse widths.

In accordance with another aspect of the invention, each of a plurality of transverse seals has a zigzag pattern. For example, and as embodied herein as depicted in FIGS. 6A-6D, each transverse seal 670 of representative film 600 includes a zigzag pattern. As used herein, the term "zigzag pattern" can be understood to include a pattern with abrupt (i.e., discontinuous) bends or corners.

Each transverse seal 670 with a zigzag pattern extends from at least proximate the longitudinal seal 650 towards the joined second edges 624 and 644 of the first and second web layers 620 and 640. A chamber 690 is defined by the longitudinal seal 650 and a pair of adjacent transverse seals 670. As with the film configurations of FIGS. 3A-3E, 4, and 5, and further in accordance with another aspect of the invention, each chamber 390 is divided into a plurality of generally polygonal chamber portions. Adjacent chamber portions of each chamber are interconnected by a flow passage in fluid communication therebetween.

Figure 6A:
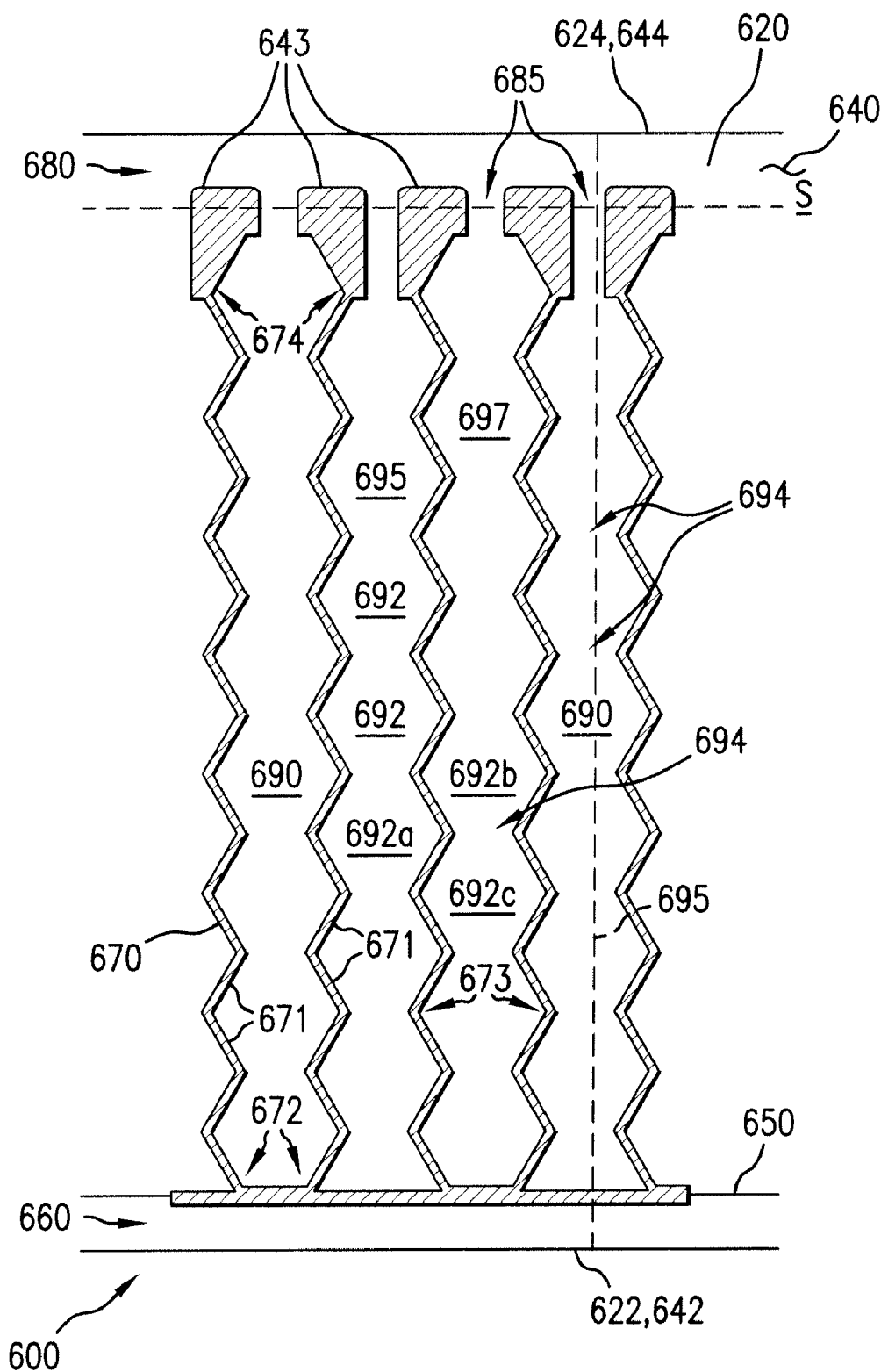
FIGS. 6A-6D are top views of alternative embodiments of the film of the present invention having transverse seals with zigzag patterns.
Figure 6B:
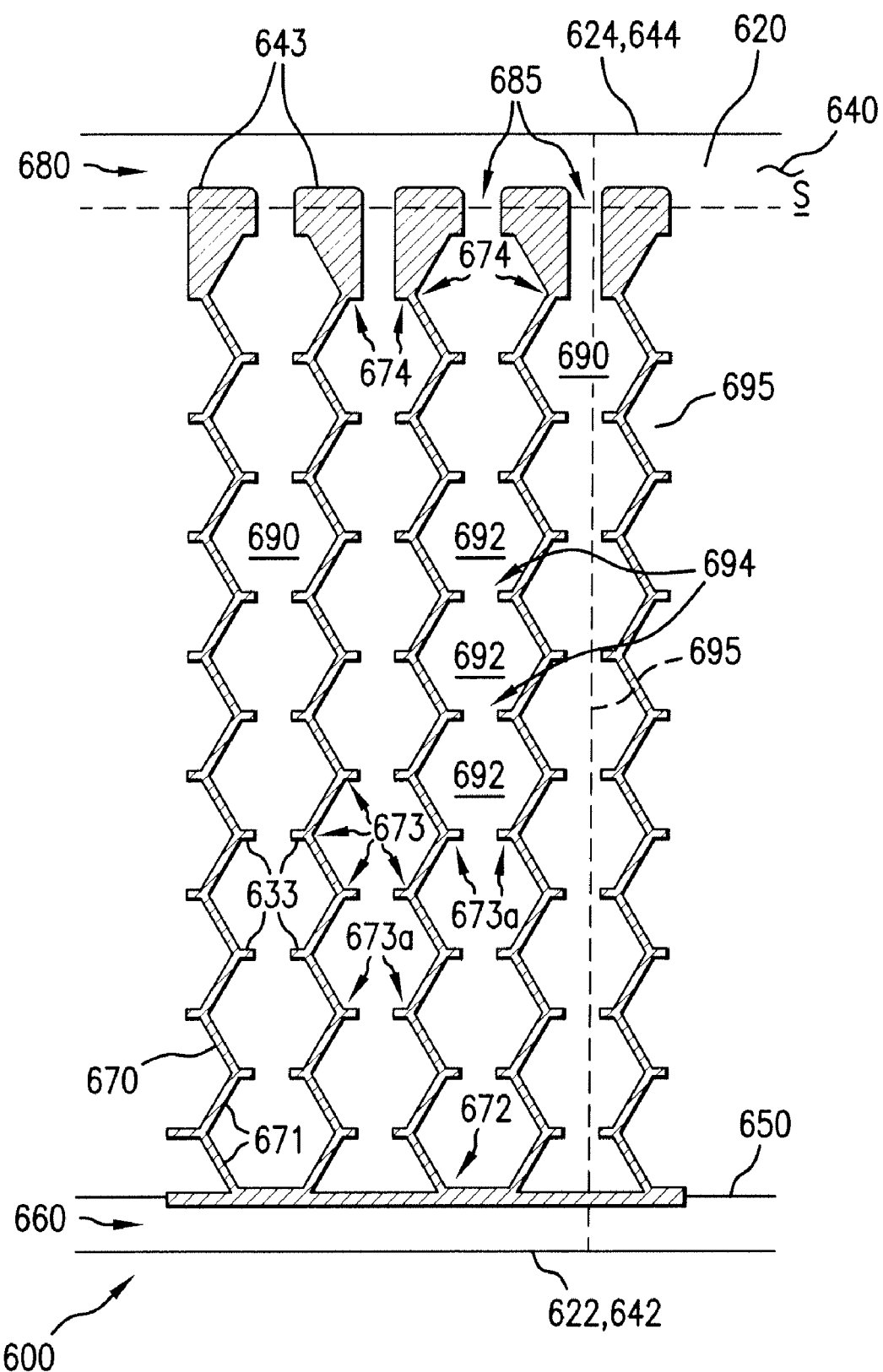
Figure 6C:
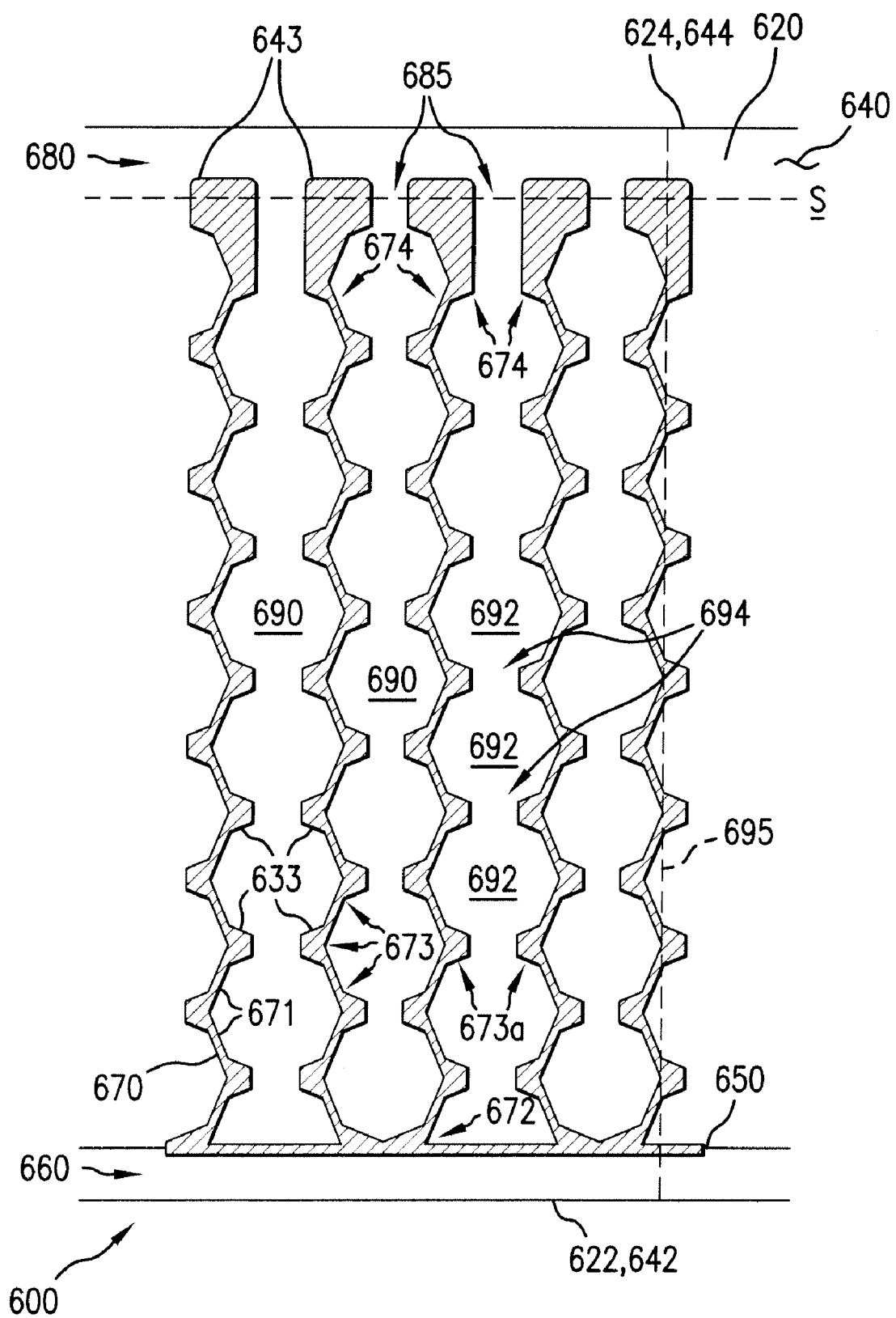

In some embodiments, such as the embodiments shown in FIGS. 6A, 6B, and 6C, each transverse seal 670 includes a group of relatively straight seal segments 671, in which adjacent seal segments form abrupt corners 673. Alternatively, in some embodiments, such as the embodiment shown in FIG. 6D, each transverse seal 670 includes a group of crosshatched or solid seal segments 631, in which adjacent crosshatched seal segments 631 are oriented with respect to each other to form corners 673.

As previously noted, the zigzag patterns of each pair of transverse seals defines a plurality of generally polygonal chamber portions within a chamber, with a flow passage formed between adjacent chamber portions. For example, and as embodied as depicted herein in FIGS. 6A-6D, each pair of transverse seals 670 of a chamber 690 defines polygonal chamber portions 692 within the chamber and flow passages 694 connecting the chamber portions 694. The polygonal chamber portions can have regular polygonal shapes (i.e., n-sided shapes in which each side includes the same length and all sides are symmetrically disposed about a common center) or irregular polygonal shapes. As used herein, the term "polygonal chamber portions" can be understood to include polygonal chamber portions with regular and irregular polygonal shapes, unless otherwise indicated by context.

Figure 6D:
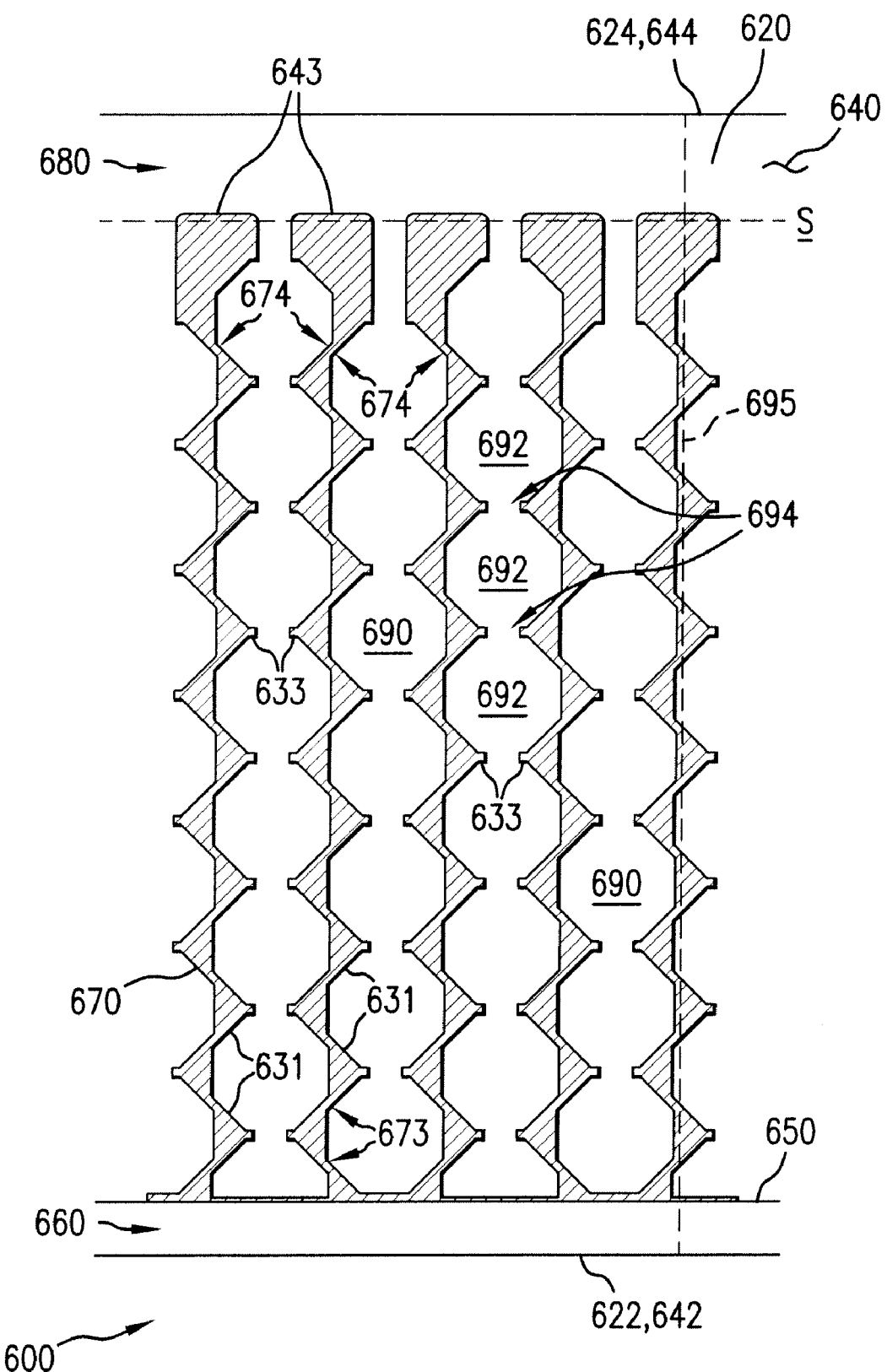

The transverse seals 670 define generally hexagonal chamber portions in the representative film 600 shown in FIGS. 6A and 6B and generally octagonal chamber portions in the representative films 600 shown in FIGS. 6C and 6D. Other shapes of the chamber portions are also possible. For example, the transverse seals 670 alone or in combination with longitudinal seal segments as previously described can define 4-sided chamber portions (e.g., rectangular, rhomboid, square, or trapezoidal chamber portions), 5-sided polygonal chamber portions (e.g., pentagonal chamber portions), and other n-sided chamber portions.

In a preferred embodiment, and as shown in FIGS. 6A-6D, the transverse seals 670 of a chamber 690 are substantial mirror images of each other about a mirror plane that passes through a transverse axis of a chamber 690 (i.e., 180 degrees out of phase). Such a relationship between the adjacent transverse seals 670 produces regular polygonal chamber portions 692 in a first chamber 690 and transversely offset polygonal chamber portions 692 in an adjacent second chamber 690. For example, as shown in FIG. 6A, at least one chamber portion (e.g., portion 692a) in a chamber (e.g., chamber 695) is transversely offset between a pair of adjacent chamber portions (e.g., portions 692b and 692c) in an adjacent chamber (e.g., chamber 697). Such a relationship also produces flow passages 694 in the first chamber 690 that are transversely aligned with the chamber portions 692 in the adjacent second chamber 690 (e.g., flow passages 694 that lie in longitudinal axes passing through the center of adjacent chamber portions 692). For example, as shown in FIG. 6A, a flow passage 694 in a first chamber (e.g., chamber 697) is transversely aligned with (i.e., lies on a longitudinal axis passing through the center of) a chamber portion in an adjacent chamber (e.g., portion 692a in chamber 695).

As shown in FIGS. 6A-6D, representative film 600 preferably includes seal arms 643 disposed at the second ends of the transverse seals 670. Each seal arm 643 is disposed between the second end 674 of a transverse seal 670 and the second edges 624 and 644 of the first and second web layers 620 and 640. Each pair of adjacent seal arms 643 defines an entrance port 685 for a chamber 690. Preferably, the adjacent seal arms 643 of a chamber 690 are substantial mirror images of each other about the transverse axis of the chamber 690. The seal arms 643 facilitate the eventual sealing of the entrance ports 685 of the chambers 690 along longitudinal seal region S after inflation.

As shown in FIGS. 6A-6D, and as preferably embodied herein, at least some of the transverse lines of weakness 695 are aligned with and extend through the transverse seals 670 and the seal arms 643 connected thereto. Other arrangements of the transverse lines of weakness 695 are also possible, such as the arrangements previously described herein.

In some embodiments, representative film 600 includes longitudinal seal segments. For example, as shown in FIGS. 6B and 6D, representative film 600 includes longitudinal seal segments 633 that extend from the transverse seals 670 of each chamber 690. The longitudinal seal segments 633 of a chamber 690 further define the polygonal chamber portions 692 and the flow passages 694 within the chamber 690. The longitudinal seal segments 673a facilitate the bending, creasing, folding, and/or otherwise deforming of inflated chambers 690 to conform to the shape of an object being packaged in film 600. Preferably, the longitudinal seal segments 633 of a chamber 690 extend from the adjacent corners 673 defined by the transverse seals 670, such as depicted in FIG. 6B of the chamber 690. Such an arrangement tends to enhance the volume of chamber portions 692. As shown in FIGS. 6B and 6D, the longitudinal seal segments 633 in a chamber 690 are transversely aligned with each other, while the longitudinal seal segments 633 in adjacent chambers 690 are transversely offset with respect to each other. As shown in FIGS. 6B-6D, the longitudinal seal segments 633 can include relatively narrow longitudinal seal segments (i.e., longitudinal seal segments with transverse widths that are approximately equal to or less than the longitudinal dimension of the transverse seal 670 from which the longitudinal seal segments extend, such as the longitudinal seal segments 633 in FIGS. 6B and 6D) or relatively wide longitudinal seal segments (i.e., longitudinal seal segments with transverse widths that are greater than the longitudinal width of the transverse seal 670 from which the longitudinal seal segments extend, such as the longitudinal seal segments 633 in FIG. 6C). Other arrangements of the longitudinal seal segments 633 are also possible, such as the arrangements previously described herein.

As embodied herein, and as depicted in FIGS. 6A and 6B, no or minimal dead space (i.e., portions of film 600 that are not capable of being inflated) exists between adjacent chambers 690 in representative film 600. Such close spacing between adjacent chambers 690 tends to reduce waste of the material of the first and second web layers.

While the disclosed films have been shown and described with reference to the illustrated embodiments, modifications are available within the scope of the present disclosure and the appended claims.

For example, each of the representative films includes first and second web layers that are aligned to be generally coextensive with each other. The films disclosed herein can include first and second web layers that are not generally coextensive with each other, if desired.

Also for example, each of the representative films includes first and second web layers having unattached first edges and joined second edges. The films disclosed herein can include first and second web layers that are joined along both the first and second edges, or along neither of the first and second edges. For example, the first and second web layers can include a single sheet of web material folded about the joined second edges and sealed together along the first edges, a tube of web material joined along first edges and second edges, or two independent sheets of web material joined, sealed, or otherwise attached together along first edges and second edges.

Also for example, each of the representative films includes transverse seals that are oriented substantially perpendicular to a longitudinal seal joining the first and second web layers together. The films disclosed herein can, alternatively, include transverse seals that are oriented at an angle to the longitudinal seal.

Also for example, each of the representative films includes a longitudinal seal joining the first and second web layers together. If desired, the films disclosed herein can include first and second web layers without such a longitudinal seal. For example, the films disclosed herein can include first and second web layers that are joined, sealed, or otherwise attached to each other along the respective first edges and the respective second edges, in which transverse seals extend from at least proximate the joined first edges towards the joined second edges.

Accordingly, the films and methods described herein are not to be limited to the embodiments described herein, can include practices other than those described, and are to be interpreted as broadly as allowed under prevailing law.

Unless otherwise provided, when the articles "a" or "an" are used herein to modify a noun, such articles can be understood to include one or more than one of the modified noun.

The invention claimed is:

1. A film for inflatable cushions, the film comprising:
a first web layer having a first longitudinal edge and a second longitudinal edge;
a second web layer having a first longitudinal edge and a second longitudinal edge, the second web layer aligned to be generally coextensive with the first web layer;
a longitudinal seal joining the first web layer and the second web layer, the longitudinal seal extending adjacent and spaced a transverse distance from the first edges of the first and second web layers, a skirt being formed by portions of the first and second web layers that extend between the longitudinal seal and the first longitudinal edges such that the first longitudinal edges are unattached to each other;

a series of transverse seals extending from the longitudinal seal towards the second edge of the first web layer and the second edge of the second web layer, a chamber being defined within a boundary formed by the longitudinal seal and a pair of adjacent transverse seals to prevent air from leaking from the chamber through or between said longitudinal and transverse seals; and a longitudinal channel having an open end and configured to receive an inflation nozzle therein, the longitudinal channel being formed on a side of the chamber opposite the longitudinal seal and being in fluid communication with the chamber for allowing fluid from the inflation nozzle to inflate the chamber.

2. The film of claim 1, wherein the longitudinal seal is spaced a transverse distance from both the first edge of the first web layer and the first edge of the second web layer.

3. The film of claim 1, wherein the second edge of the first web layer is joined to the second edge of the second web layer.

4. The film of claim 3, wherein the first and second web layers include a single sheet of web material, in which the second edge of the first web layer is aligned with the second edge of the second web layer.

5. The film of claim 4, wherein the single sheet of web material is folded about the aligned second edges of the first and second web layers.

6. The film of claim 3, wherein the first and second web layers include a tube of web material, in which the first edge of the first web layer is aligned with the first edge of the second web layer and the second edge of the first web layer is aligned with the second edge of the second web layer.

7. The film of claim 6, wherein the tube is slit along the aligned first edges of the first and second web layers.

8. The film of claim 3, wherein each transverse seal has a first end contacting the longitudinal seal and a second end spaced a transverse dimension from the second edge of the first web layer and the second edge of the second web layer, the longitudinal channel being defined between the second ends of the transverse seals and the second edges of the first and second web layers.

9. The film of claim 8, wherein the transverse distance of the longitudinal seal to the at least one first edge is equal to the transverse dimension of the second end to the second edge.

10. The film of claim 1, further comprising:
a second longitudinal seal joining the first web layer and the second web layer, the second longitudinal seal extending adjacent and spaced a transverse distance from the second edge of the first web layer and the second edge of the second web layer, a second skirt being formed by portions of the first and second web layers that extend between the second longitudinal seal and the second edges such that the second edges are unattached from each other.

11. The film of claim 10, further comprising:
a series of second transverse seals extending from the second longitudinal seal towards the first edge, a second chamber being defined within a boundary formed by the second longitudinal seal and a pair of adjacent second transverse seals.

12. The film of claim 11, wherein the longitudinal channel is disposed between the first chamber and the second chamber.

13. The film of claim 12, wherein each first transverse seal has a first end contacting the first longitudinal seal and a second end spaced transversely from the first longitudinal seal, each second transverse seal has a first end proximate the second longitudinal seal and a second end spaced transversely from the second longitudinal seal, the longitudinal channel being defined between the second ends of the first transverse seals and the second ends of the second transverse seals, the first chamber and the second chamber being in fluid communication with the longitudinal channel.

14. The film of claim 1, wherein each transverse seal includes a pair of adjacent parallel straight seal lines.

15. The film of claim 14, further comprising:
a transverse line of weakness disposed between the pair of adjacent seal lines.

16. The film of claim 1, wherein each transverse seal has a width, and further wherein a transverse line of weakness is aligned with and extends through the width of the transverse seal.

17. The film of claim 1, further comprising:
a series of lines of weakness extending transversely across the first web layer and the second web layer.

18. The film of claim 17, wherein each transverse line of weakness extends from the first edges of the first and second web layers to the second edges of the first and second web layers.

19. The film of claim 17, wherein each transverse line of weakness extends across the longitudinal seal.

20. The film of claim 17, wherein each transverse line of weakness includes a row of perforations.

21. The film of claim 17, wherein each transverse line of weakness includes a score line.

22. The film of claim 17, wherein each transverse line of weakness is formed by a reduced strength of material of the first and second web layers.

23. A film for inflatable cushions, the film comprising:
a first web layer;
a second web layer disposed over the first web layer and connected therewith to define a plurality of air chambers therebetween, and to define a longitudinal inflation channel extending between the first and second layer that has an open end and is configured to receive an inflation nozzle therein, the longitudinal inflation channel being in fluid communication with the air chambers; and
a series of transverse seals spaced apart from each other, each transverse seal having a first end on one transverse side of at least one of the chambers, and a second end that is disposed proximate the longitudinal inflation channel on the other transverse side of the at least one chamber, wherein each transverse seal comprises at least three straight seal segments disposed at angles with respect to each other and cumulatively extending transversely to define the longitudinal sides of the air chambers and being arranged such that the air chambers are sealed from each other and from the longitudinal inflation channel upon application of a longitudinal seal extending adjacent the longitudinal inflation channel and across the transverse seals.

24. The film of claim 23, wherein the straight seal segments are connected to each other by abrupt bends or corners.

25. The film of claim 23, further comprising a line of weakness extending through at least one of the transverse seals.

26. The film of claim 23, wherein the straight seal segments are arranged to divide the chambers into a plurality of chamber portions having polygonal shapes, wherein adjacent chamber portions are in fluid communication with each other at a location where a straight seal segment of adjacent transverse seals converge to define a passageway from one chamber portion to an adjacent chamber portion.

27. The film of claim 26, wherein sides of the polygonal shapes that are disposed between the chamber portions are substantially free of seal segments.

28. The film of claim 26, further comprising longitudinal seal segments disposed at intersections between the straight seal segments between the chamber portions along sides of the polygonal shapes.

29. The film of claim 28, wherein the longitudinal seal segments further define a flow passage between the polygonal chamber portions within each air chamber.

30. The film of claim 28, wherein a first side of the polygonal chamber portion is formed by at least one of the straight seal segments, and wherein a second side of the polygonal chamber portion is formed by at least one of the longitudinal seal segments.

31. The film of claim 23, wherein the straight seal segments are arranged to divide the chambers into a plurality of chamber portions having polygonal shapes, wherein the chamber portions have longitudinally narrower parts and longitudinally wider parts, the chamber portions of the chambers being in fluid communication with chamber portions adjacent thereto at the longitudinally narrower parts.

32. The film of claim 31, wherein the straight seal segments include opposed straight seal segments disposed on opposite longitudinal sides of the chamber at at least one of the chamber portions and oriented with respect to each other to define at least one of the longitudinally narrower parts.

33. The film of claim 26, wherein the polygonal shapes include at least a hexagon or an octagon.

34. The film of claim 26, wherein the straight seal segments define an exterior border of chambers.

35. The film of claim 26, wherein the polygonal shapes include regular polygonal shapes.

36. The film of claim 26, wherein at least some of the chamber portions of a chamber have substantially a same shape.

37. The film of claim 26, wherein at least one of the polygonal shapes has at least four sides.

38. The film of claim 23, wherein at least two straight seal segments are disposed at a non-longitudinal and non-transverse angle.

39. The film of claim 38, wherein the angle is an acute angle with respect to a longitudinal direction of the layers.

40. The film of claim 23, wherein the straight seal segments are oriented and configured to facilitate bending the film therealong about a plurality of axes offset from the longitudinal and transverse to allow the film to conform to the shape of an object being packed.

41. The film of claim 23, wherein each transverse seal has a zigzag pattern.

42. The film of claim 23, wherein the first and second web layers include a single sheet of web material, in which the first web layer is aligned with the second web layer.

43. The film of claim 23, wherein the film comprises a plurality of chambers, each chamber having a plurality of chamber portions that are each defined by a plurality of straight seal segments disposed at angles with respect to each other and cumulatively extending transversely to define adjacent opposite longitudinal sides of the plurality of chamber portions of each of the plurality of chambers.

44. The film of claim 43, wherein the plurality of chambers are disposed between adjacent transverse lines of weakness.

* * * * *